United States Patent
Picardo

(10) Patent No.: US 11,222,229 B1
(45) Date of Patent: Jan. 11, 2022

(54) SYSTEM AND METHOD FOR MULTIDIMENSIONAL GRADIENT-BASED CROSS-SPECTRAL STEREO MATCHING

(71) Applicant: The Charles Stark Draper Laboratory, Inc., Cambridge, MA (US)

(72) Inventor: Christopher Bruno Picardo, Las Vegas, NV (US)

(73) Assignee: The Charles Stark Draper Laboratory, Inc., Cambridge, MA (US)

( * ) Notice: Subject to any disclaimer, the term of this patent is extended or adjusted under 35 U.S.C. 154(b) by 100 days.

(21) Appl. No.: 16/296,881

(22) Filed: Mar. 8, 2019

Related U.S. Application Data

(60) Provisional application No. 62/678,844, filed on May 31, 2018.

(51) Int. Cl.
*G06K 9/62* (2006.01)
*G06T 7/00* (2017.01)
(Continued)

(52) U.S. Cl.
CPC ......... *G06K 9/6212* (2013.01); *G06K 9/0063* (2013.01); *G06K 9/00201* (2013.01);
(Continued)

(58) Field of Classification Search
CPC ......... G06K 9/628; G06K 2009/00644; G06K 9/6212; G06K 9/00201; G06K 9/0063; G06K 9/00697; G06K 9/6202; G06T 7/0002; G06T 2207/10004; G06T 2207/10012; G06T 2207/10048; G06T 2207/20072; G06T 2207/30168; H04N 5/33

See application file for complete search history.

(56) References Cited

U.S. PATENT DOCUMENTS 9,195,904 B1    11/2015    Liu et al.
9,224,060 B1    12/2015    Ramaswamy
(Continued)

FOREIGN PATENT DOCUMENTS

WO    WO 2018/223267 A1    12/2018

OTHER PUBLICATIONS

Picardo et al "Comprehensive comparison of gradient-based cross-spectral stereo matching generated disparity maps" IEEE 2017.*
(Continued)

*Primary Examiner* — Sean T Motsinger
(74) *Attorney, Agent, or Firm* — Sunstein LLP

(57) ABSTRACT

A hardware system is configured for, and a method of, generating detail-rich gradient-based disparity maps in real-time using an automated gradient-based disparity map classification process that is scalable, can be used under different environment conditions with little to no restrictions, and whose level of precision can be adjusted in a scalable manner. Highly accurate cross-spectral stereo matching methods may be used for search and rescue operations and work at day time and night time using current and past visual and full infrared imaging to generate, classify, and identify scenes in real-time with minimum constraints. Such system and methods may be used to improve operations of existing search and rescue equipment.

18 Claims, 34 Drawing Sheets

(51) Int. Cl.
 *G06K 9/00* (2006.01)
 *H04N 5/33* (2006.01)
(52) U.S. Cl.
 CPC ....... *G06K 9/00697* (2013.01); *G06K 9/6202* (2013.01); *G06K 9/628* (2013.01); *G06T 7/0002* (2013.01); *G06K 2009/00644* (2013.01); *G06T 2207/10004* (2013.01); *G06T 2207/10012* (2013.01); *G06T 2207/10048* (2013.01); *G06T 2207/20072* (2013.01); *G06T 2207/30168* (2013.01); *H04N 5/33* (2013.01)

(56) References Cited

U.S. PATENT DOCUMENTS

| | | | |
|---|---|---|---|
| 9,349,180 B1* | 5/2016 | Ramaswamy | G06K 9/4642 |
| 2010/0172567 A1 | 7/2010 | Prokoski | |
| 2018/0189550 A1* | 7/2018 | McCombe | G06K 9/00208 |
| 2019/0220694 A1* | 7/2019 | Biswas | G06K 9/6202 |

OTHER PUBLICATIONS

Facciolo, G., et al., "MGM: A Significantly More Global Matching for Sterovision," BMVC Press, 1 pages, 2015.
Hirschmüller, H., "Stereo Processing by Semi-Global Matching and Mutual Information," *IEEE Transactions on Pattern Analysis and Machine Intelligence*, 14 pages, Apr. 2017.
Pinggera, P., et al., "On Cross-Spectral Stereo Matching Using Dense Gradient Features,", *Computer Vision and Pattern Recognition (CVPR)*, 12 pages, 2012.
Washbourne, R., "What is Stereo Matching?" www.DEVPY.ME. what-is-stereo-matching/; 4 pages, retrieved on Jan. 28, 2019; dated Oct. 21, 2015.
Non-Final Office Action, U.S. Appl. No. 16/296,936, 44 pages, Sep. 1, 2020.

* cited by examiner

01: Use visual image $I_1$ and full infrared image $I_2$ as inputs to compute $HOG_1$ and $HOG_2$:
02: begin
03:    Select a kernel
04:    Select a norm
05:    Form a Magnitudes Matrix $M_i$:
06:    for each pixel in $I_i$
07:      Evaluate gradient components $\delta\_ =$ filter $(I_i, $ kernel$)$
08:      Compute Magnitude gradients $= \sqrt{(\delta x^2 + \ldots + \delta y^2)}$.
09:    end for
10:    Normalize $M_i$.
11:    Form Angle Matrix:
12:    for each pixel in $I_i$
13:      Compute corresponding Angle Orientation $\theta = $ atan2 $(\delta y, \delta x)$.
14:    end for
15:    Set $M_1$ to $HOG_1$ and $M_2$ to $HOG_2$.
16: end
17: Apply the Distance Operation between $HOG_1$ and $HOG_2$.
18: Set resulting Matrix to Cost Matrix C (width, height).
19: Draw an output Disparity Map using the values in the Cost Matrix C (width, height).

*FIG. 3F*

| Environmental Cond. | Signature | Category | Type | IP Vector |
|---|---|---|---|---|
| Conditions A | | Recognizable | Good | IP Vector A1 |
| Conditions A | | Recognizable | Fair | IP Vector A2 |
| Conditions A | | Recognizable | Poor | IP Vector A3 |
| Conditions A | | Unrecognizable | Solid | IP Vector A4 |
| Conditions A | | Unrecognizable | Mostly Solid | IP Vector A5 |
| Conditions A | | Unrecognizable | Grainy | IP Vector A6 |
| Conditions B | | Recognizable | Good | IP Vector B1 |
| Conditions B | | Recognizable | Fair | IP Vector B2 |
| Conditions B | | Recognizable | Poor | IP Vector B3 |
| Conditions B | | Unrecognizable | Solid | IP Vector B4 |
| Conditions B | | Unrecognizable | Mostly Solid | IP Vector B5 |
| Conditions B | | Unrecognizable | Grainy | IP Vector B6 |

*FIG. 7A*

| Environmental Cond. | Signature | Category | Type | IP Vector |
|---|---|---|---|---|
| Conditions C | 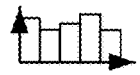 | Recognizable | Good | IP Vector C1 |
| Conditions C | 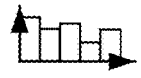 | Recognizable | Fair | IP Vector C2 |
| Conditions C | 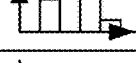 | Recognizable | Poor | IP Vector C3 |
| Conditions C | 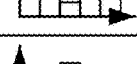 | Unrecognizable | Solid | IP Vector C4 |
| Conditions C | 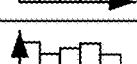 | Unrecognizable | Mostly Solid | IP Vector C5 |
| Conditions C | 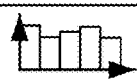 | Unrecognizable | Geom. Patterns | IP Vector C6 |
| Conditions C |  | Unrecognizable | Landmarks | IP Vector C7 |
| Conditions D | 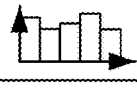 | Recognizable | Good | IP Vector D1 |
| Conditions D | 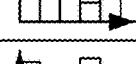 | Recognizable | Fair | IP Vector D2 |
| Conditions D | 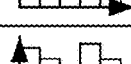 | Recognizable | Poor | IP Vector D3 |
| Conditions D | 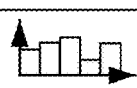 | Unrecognizable | Solid | IP Vector D4 |
| Conditions D |  | Unrecognizable | Mostly Solid | IP Vector D5 |
| Conditions D | 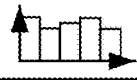 | Unrecognizable | Geom. Patterns | IP Vector D6 |
| Conditions D |  | Unrecognizable | Landmarks | IP Vector D7 |

*FIG. 7B*

```
01:  Use a GB-CSSM algorithm generated DM as input
02:  begin
03:    Find smallest and largest disparity in the DM matrix. Both values define the range of disparities.
⇨04:   Define n as the number of partitions in the range of disparities. A larger n increases disparity
         resolution and the algorithm's accuracy.
05:    Divide the range in n partitions & organize them in increasing order of disparities
06:    Call each partition subrange i.
07:    Define subrange 0 as the disparities with zero value.
08:    Count the # of disparities within every subrange i.
09:    Calculate the percentage each subrange i represents respect to all subranges (disparities).
⇨10:   Define Threshold$_{MSC}$ as the sum of the percentage of disparities that fall between subranges
         0 and 3 (Typically 0.99 or higher).
11:    If ∀ disparities ∈ subrange 0:
12:    begin
13:      Categorize DM as an UNRECOGNIZABLE SCENE with SOLID COLOR. Represents a
           false positive DM.
14:    end
⇨15:   If the Σsubrange$_{(i: 0 \to 3)}$ >=Threshold$_{MSC}$
16:    begin
17:      Categorize DM as an UNRECOGNIZABLE SCENE, with MOSTLY SOLID COLOR (MSC).
           Represents a really poor DM.
18:    end
⇨19:   If subrange 1 ∈ GRAINY DM Subset
```

From Fig. 8B

20: begin
21:     Categorize DM as an unrecognizable scene with GRAINY DM.
22: end
23: ELSE Recognize DM as RECOGNIZABLE SCENE of TYPE:
24: begin
⇨ 25:   If subrange 1 ∈ [SUBSET of POOR Recognizable Scenes]
26:     begin
27:         Categorize DM as a recognizable scene of type POOR.
28:     end
⇨ 29:   If subrange 1 ∈ [SUBSET of FAIR Recognizable Scenes]
30:     begin
31:         Categorize DM as a recognizable scene of type FAIR.
32:     end
33:     ELSE DM is a Recognizable scene of type GOOD.
34: end
35: Assign the DM CATEGORY + TYPE to the Input parameter Combination
36: end

*FIG. 8B*
*Continued*

```
01: Use a GB-CSSM algorithm generated DM as input
02: begin
03:    Find smallest and largest disparity in the DM matrix. Both values define the range of disparities.
⇨ 04:    Define n as the number of partitions in the range of disparities. A larger n increases disparity
         resolution and the algorithm's accuracy.
05:    Divide the range in n partitions & organize them in increasing order of disparities
06:    Call each partition subrange i.
07:    Define subrange 0 as the disparities with zero value.
08:    Count the # of disparities within every subrange i.
09:    Calculate the percentage each subrange i represents respect to all subranges (disparities).
⇨ 10:   Define Threshold$_{MSC}$ as the sum of the percentage of disparities that fall between subranges
         0 and 3 (Typically 0.99 or higher).
11:    If ∀ disparities ∈ subrange 0:
12:    begin
13:       Categorize DM as an UNRECOGNIZABLE SCENE with SOLID COLOR. Represents a
            false positive DM.
14:    end
⇨ 15:   If the Σsubrange$_{(i: 0 → 3)}$ >=Threshold$_{MSC}$
16:    begin
17:       Categorize DM as an UNRECOGNIZABLE SCENE with MOSTLY SOLID COLOR (MSC).
            Represents a really poor DM.
18:    end
⇨ 19:   If subranges 0 to 7 ∈ GEOMETRIC PATTERNS DM Subset
20:    begin
21:       Categorize DM as an unrecognizable scene with GEOMETRIC PATTERNS.
22:    end
```

From Fig. 9B

```
⇨ 23:    If subranges 0 to 11 ∈ LANDMARKS DM Subset
  24:    begin
  25:        Categorize DM as an unrecognizable scene with LANDMARKS.
  26:    end
  27:    ELSE Recognize DM as RECOGNIZABLE SCENE of TYPE:
  28:    begin
⇨ 29:        If subrange 1 ∈ [SUBSET of POOR Recognizable Scenes]
  30:        begin
  31:            Categorize DM as a recognizable scene of type POOR.
  32:        end
⇨ 33:        If subrange 1 ∈ [SUBSET of FAIR Recognizable Scenes]
  34:        begin
  35:            Categorize DM as a recognizable scene of type FAIR.
  36:        end
  37:        ELSE DM is a Recogniable scene of type GOOD.
  38:    end
  39:    Assign the DM CATEGORY + TYPE to the Input parameter Combination
  40: end
```

*FIG. 9B Continued*

SYSTEM AND METHOD FOR MULTIDIMENSIONAL GRADIENT-BASED CROSS-SPECTRAL STEREO MATCHING

RELATED APPLICATIONS

This patent application claims priority from provisional U.S. patent application No. 62/678,844, filed May 31, 2018, entitled, "System and Method for Multidimensional Gradient-Based Cross-Spectral Stereo Matching (GB-CS SM)," the disclosure of which is incorporated herein, in its entirety, by reference. This application is related to U.S. patent application Ser. No. 16/296,785, titled "System and Method for Multidimensional Gradient-Based Cross-Spectral Stereo Matching" and U.S. patent application Ser. No. 16/296,936, titled "System and Method for Multidimensional Gradient-Based Cross-Spectral Stereo Matching".

TECHNICAL FIELD

The present invention relates to stereo matching of images, and more particularly to stereo matching of cross-spectral images.

BACKGROUND ART

Stereo matching algorithms use a pair of cameras to create fast and robust disparity maps that serve to describe and recognize scenes in a diverse number of applications. Examples of systems using stereo matching include NASA's Mars Exploration Rover (MER) mission involving two Mars rovers, Spirit and Opportunity, the HiRISE camera on the Mars Reconnaissance Orbiter, self-driving cars, motion and object tracking to measure paths (surveillance), traffic scene analysis (transport), 3D reconstruction, and unmanned aerial vehicles (UAVs). In each case, the algorithm uses a pair of visual cameras to create pixel-based disparity maps to identify a scene. This setup works well both indoors and outdoors and in many environments; however, it is restricted to day time and ideal weather conditions.

Visual cameras work poorly at night or in environments with limited light sources. Moreover, visual stereo matching is of limited value when weather conditions offer poor visibility. Under these circumstances, visual image capture is not possible.

An alternative is to employ two full infrared (FIR) cameras to create pixel-based disparity maps. For example, an aircraft 110 performing search and rescue over an area of interest 101 is constrained to use full IR cameras in an attempt to match as accurately as possible the area of interest against a visual image of the same area taken at an earlier date when weather conditions were favorable.

However, many applications require both a visual camera and an infrared camera to cover day and night or under different weather conditions or at different points in time, forcing the algorithm to accept a cross-spectral input-image pair. This is important when trying to identify a location or scene from a previous occurrence. In this new setup (e.g., when the images form a cross-spectral image pair), the pixel-based stereo matching approach will not work because differences in pixel intensities between cross-spectral images are significant and result in poor disparity maps.

As an example, autonomous systems designed for deep space collect images of interstellar objects use their relative locations to triangulate a spaceship coordinate system, and analyze them to identify landmarks of interest on the surfaces of celestial objects. In other words, there is a deep-space positioning system on board with cameras designed for multi-spectrum image capture to enable robust stereo matching for location, recognition and terrain mapping of, for example, a planet and its surface.

SUMMARY OF THE EMBODIMENTS

In accordance with one embodiment, a computer-implemented method of operating a stereo matching system for an environment having environmental conditions includes specifying an environment-specific input parameter (IP) vector for generation of a disparity map, the IP vector including a set of input parameters for a stereo matching system or method. In preferred embodiments, the stereo matching system or method is a gradient-based, cross-spectral stereo matching system or method, and the environment-specific IP vector for generation of the disparity map includes a set of input parameters for the gradient-based, cross-spectral stereo matching system or method.

The method also includes obtaining a visual image that includes a set of visual pixels. Using the input parameters, a visual oriented gradient is generated for each visual pixel in the set of visual pixels, to produce a set of visual oriented gradients. From the set of visual oriented gradients, a visual histogram of gradients (HOG) is generated for the visual image.

The method further includes obtaining an infrared image that includes a set of infrared pixels. Using the input parameters, an infrared oriented gradient is generated for each infrared pixel in the set of infrared pixels, to produce a set of infrared oriented gradients. From the set of infrared oriented gradients, an infrared HOG is generated for the infrared image.

The method further includes using the visual HOG and the infrared HOG to generate a disparity map.

In illustrative embodiments, the environmental conditions include one or more (or any combination of) of the following: (a) specified weather conditions, and the environment-specific IP vector is selected based in part on the specified weather conditions; (b) a specified season of the year, and the environment-specific IP vector is selected based in part on the specified season of the year; (c) a specified time of day, and the environment-specific IP vector is selected based in part on the specified time of day; (d) a specified ambient light level, and the environment-specific IP vector is selected based in part on the specified ambient light level; and/or (e) a specified terrain, and the environment-specific IP vector is selected based in part on the specified terrain.

In illustrative embodiments, the set of input parameters of the IP vector includes one or more of the following: (i) a coordinate system; (ii) a kernel; (iii) a norm parameter; (iv) a distance operation; (v) an area overlap; (vi) a bin size; and/or (vii) an order of bin evaluation.

The method also includes obtaining a visual image including a set of visual pixels; and generating, for each pixel in the set of visual pixels and using the input parameters, an oriented gradient, to produce a set of visual oriented gradients; and generating, from the set of visual oriented gradients, a visual HOG for the visual image.

The method also includes obtaining an infrared image including a set of infrared pixels; and generating, for each pixel in the set of infrared pixels and using the input parameters, an oriented gradient, to produce a set of infrared oriented gradients; and generating, from the set of infrared oriented gradients, an infrared HOG for the infrared image. Then the method includes generating, using the visual HOG and the infrared HOG, a disparity map.

In some embodiments, generating an oriented gradient for each pixel in the set of visual pixels includes convolving the visual image with the kernel to produce, for each pixel in the visual image, two orthogonal visual gradient vectors; generating, from the two orthogonal visual gradient vectors for each pixel in the visual image, a visual magnitude, to form the set visual oriented gradients; normalizing the magnitude of each oriented gradient in the set of visual oriented gradients to produce the visual HOG; and generating an oriented gradient for each pixel in the set of infrared pixels, including convolving the infrared image with the kernel to produce, for each pixel in the infrared image, two orthogonal infrared gradient vectors; generating, from the two orthogonal infrared gradient vectors for each pixel in the infrared image, an IR magnitude, to form the set infrared oriented gradients; and normalizing the IR magnitude of each oriented gradient in the set of infrared oriented gradients to produce the infrared HOG.

In illustrative embodiments, the stereo matching system is a search and rescue system, or a navigation system.

In accordance with another embodiment, a system for generating a disparity map from a cross-spectral image pair of a scene, for an environment having environmental conditions, includes a cross-spectral image procurement module configured to procure a cross-spectral image pair that includes both a visual image of the scene and an infrared image of the scene. An environmental conditions module is configured to receive a specification of the environmental conditions. An IP vector selection module is configured to automatically select, based on the specification of the environmental conditions, from a plurality of candidate IP vectors, an environment-specific IP vector that includes a set of input parameters correlated to the environmental conditions. A visual HOG generation module is configured to generate, from the visual image, a visual histogram of gradients using the environment-specific IP vector. An IR HOG generation module is configured to generate, from the infrared image, an infrared histogram of gradients using the environment-specific IP vector. A disparity map generation module is configured to produce, from the visual histogram and infrared histogram, a disparity map. Some embodiments also include a display apparatus disposed to display, to an operator, the disparity map.

Some embodiments also include a classification module configured to: produce, from the cross-spectral image pair, a plurality of disparity maps from a corresponding plurality of IP vectors; produce, from the plurality of disparity maps, a corresponding plurality of fingerprints, each fingerprint of the plurality of fingerprints corresponding to a corresponding one of the plurality of disparity maps; match each fingerprint of the plurality of fingerprints to a corresponding signature from a plurality of signatures in which each signature from the plurality of signatures corresponds to a classification; assign to each fingerprint the classification of the signature matched to the fingerprint; rank each of the plurality of IP vectors according to the classification of the disparity map produced by each such IP vector, to produce a ranked set of candidate IP vectors; and provide the ranked set of candidate IP vectors to the IP vector selection module.

In some embodiments, the ranked set of candidate IP vectors includes a highest-ranked IP vector, and the IP vector selection module is configured to select the highest-ranked IP vector as the environment-specific IP vector.

In some embodiments, the disparity map generation module is configured to produce in real-time, from a subsequent set of cross-spectral image pairs, and using the environment-specific IP vector, a corresponding set of subsequent disparity maps.

In some embodiments, each candidate IP vector has an associated runtime, and the IP vector selection module is configured to select the environment-specific IP vector by shortest runtime.

In some embodiments, the cross-spectral image procurement module is configured to retrieve the visual image of the scene from a database; and to obtain the infrared image of the scene from an infrared camera disposed to capture the infrared image of the scene.

An embodiment of the present invention provides a computer-implemented method for automatically classifying a disparity map for a cross-spectral image pair. The method includes generating a disparity map using a corresponding input parameter (IP) vector. The disparity map is generated from a cross-spectral pair of images. The cross-spectral pair of images includes a visual image of a scene and an infrared image of the scene. A fingerprint is generated from the disparity map.

A set of signatures is provided. Each signature of the set of signatures is associated with a corresponding class.

The fingerprint is matched to one fingerprint of the set of signatures. The one fingerprint of the set of signatures is a matched signature.

The disparity map is classified into the class associated with the matched signature.

Optionally, in any embodiment, prior to generating the disparity map, the cross-spectral pair of images is procured.

Optionally, in any embodiment, procuring the cross-spectral pair of images includes obtaining the visual image from a database of visual images, and capturing the infrared image with an infrared camera. Optionally, in any embodiment, procuring the cross-spectral pair of images includes obtaining the infrared image from a database of infrared images, and capturing the visual image with a visual camera.

Optionally, in any embodiment, each signature of the set of signatures is associated with a type. The type may be a subcategory of the corresponding class. The disparity map may be classified into the class and type associated with the matched signature.

Optionally, in any embodiment, each signature of the set of signatures is associated with a set of environmental conditions describing the scene. The disparity map may be associated with the environmental conditions.

Optionally, in any embodiment, the matched signature is updated to include the fingerprint.

Optionally, in any embodiment, the signature is a histogram having a plurality of signature partitions, and the fingerprint is a histogram having a corresponding set of fingerprint partitions. Updating the matched signature to include the fingerprint may include creating an updated signature by averaging each signature partition with its counterpart fingerprint partition.

Optionally, in any embodiment, classifying the disparity map into the class associated with the matched signature includes assigning, to the corresponding IP vector, the class associated with the matched signature.

Optionally, in any embodiment, classifying the disparity map into the class associated with the matched signature includes assigning, to the corresponding IP vector, the class associated with the matched signature to produce a classified IP vector. The classified IP vector may be added to a family of previously-classified IP vectors. Each of the previously-classified IP vectors may be classified into the class associated with the matched signature.

Another embodiment of the present invention provides a system for automatically classifying a disparity map for a cross-spectral image pair. The system includes an image procurement module. The image procurement module is configured to procure the cross-spectral image pair. The cross-spectral image pair includes a visual image of a scene and an infrared image of the scene. A disparity map generation module is configured to generate, from the cross-spectral image pair, a disparity map using a corresponding IP vector. A fingerprint generation module is configured to generate, from the disparity map, a fingerprint.

A memory has (stores) a set of signatures. Each signature of the set of signatures is associated with a corresponding class. A matching module is configured to match the fingerprint to a one of the signatures in the set of signatures. The one of the signatures is a matched signature.

A classification module is configured to classify the disparity map into the class associated with the matched signature.

Optionally, any embodiment can include a database of visual images. The database is in data communication with the image procurement module. The database is configured to provide the visual image of the scene. An infrared camera is disposed to capture the infrared image of the scene.

Optionally, in any embodiment, each signature of the set of signatures is associated with a set of environmental conditions describing the scene. The classification module is further configured to associate the disparity map with the set of environmental conditions.

Optionally, in any embodiment, the classification module is further configured to assign, to the corresponding IP vector, the class associated with the matched signature.

Yet another embodiment of the present invention provides a computer-implemented method for automatically classifying a plurality of disparity maps for a cross-spectral image pair. The cross-spectral pair of images is received. The cross-spectral pair of images includes a visual image of a scene and an infrared image of the scene.

A plurality of disparity maps is generating from the cross-spectral pair of images. Each disparity map is generated using a unique corresponding IP vector. For each disparity map of the plurality of disparity maps, a runtime is recorded. The runtime represents an amount of time required to produce the disparity map.

The plurality of disparity maps is ranked in order of runtime.

Optionally, in any embodiment, a validity metric is determined for each disparity map. The validity metric is a quantitative indicator of how recognizable structures are in a scene in the cross-spectral image pair.

Optionally, in any embodiment, determining the validity metric includes determining, for each disparity map, a number of disparities in the disparity map and identifying, by magnitude, a median disparity. The median disparity has a median magnitude. The validity metric may be determined as a quantity, where the quantity is a number of disparities having a magnitude less than the magnitude of the median disparity.

Optionally, in any embodiment, for each disparity map, an accuracy metric is determined. The accuracy metric is a quantitative indicator of how closely the disparity map resembles the images of the cross-spectral image pair.

Optionally, in any embodiment, determining, for each disparity map, the accuracy metric includes summing the disparities of the disparity map to produce a sum of disparities and establishing, as the accuracy metric for the disparity map, the sum of disparities.

Optionally, any embodiment includes determining a validity metric, for each disparity map. A first set of disparity maps is identified. The first set of disparity maps includes validity maps having validity metrics above a first threshold. For each disparity map, an accuracy metric is determined. A second set of disparity maps is identified. The second set of disparity maps includes disparity maps having accuracy metrics above a second threshold. A third set of disparity maps (the "Pareto set") is identified. The third set of disparity maps includes disparity maps common to the first set of disparity maps and the second set of disparity maps. A 3D Pareto frontier is produced. The 3D Pareto frontier has three axes. The 3D Pareto frontier includes the disparity maps from the third set of disparity maps. The three axes are runtime, validity metric, and accuracy metric.

An embodiment of the present invention provides a computer-implemented method for automatically selecting an IP vector for a cross-spectral stereo matching system. The method includes procuring an input cross-spectral image pair of a scene. The cross-spectral image pair includes a visual image of the scene and an infrared image of the scene. A plurality of unique IP vectors is provided. From the input cross-spectral image pair, a plurality of unique disparity maps is generated. Each unique disparity map of the plurality of unique disparity maps is produced by a corresponding one of the plurality of unique IP vectors. Each unique disparity map has an associated unique IP vector.

For each unique disparity map of the plurality of unique disparity maps, a corresponding fingerprint is generated to produce a plurality of fingerprints. Each fingerprint of the plurality of fingerprints is associated with unique IP vector associated with the disparity map from which the fingerprint was generated. A set of signatures is provided. Each signature of the set of signatures is associated with a corresponding family of IP vectors. For each fingerprint of the plurality of fingerprints, the fingerprint and its associated unique IP vector is correlated to a corresponding one of the signatures.

Each unique IP vector is added to the family of IP vectors in association with a signature to which its fingerprint is correlated. An IP vector from a family of IP vectors associated with a highest classification is selected as the selected IP vector.

Optionally, in any embodiment, the method may also include ranking each family of IP vectors by classification.

Optionally, in any embodiment, the family of IP vectors includes an IP vector most recently added to the family of IP vectors, and selecting the IP vector includes selecting the IP vector most recently added to the family of IP vectors.

Optionally, in any embodiment, the family of IP vectors includes an IP vector having a shortest runtime, and selecting an IP vector includes selecting the IP vector having the shortest runtime.

Optionally, in any embodiment, the set of signatures includes subsets of signatures. Each subset of signatures is defined by a corresponding set of environmental conditions from a plurality of sets of environmental conditions. Correlating the fingerprint and its associated unique IP vector to a corresponding one of the signatures includes correlating the fingerprint and its associated unique IP vector to a corresponding one of the signatures from a specific one of the plurality of sets of environmental conditions.

Another embodiment of the present invention provides a system for automatically selecting an IP vector (a "selected IP vector") for cross-spectral stereo matching. The system includes an image procurement module. The image procurement module is configured to procure an input cross-spectral image pair of a scene. The input cross-spectral image pair includes a visual image of the scene and an infrared image of the scene.

The system also includes a memory that has (stores or is configured to store) a plurality of unique IP vectors. A memory has (stores or is configured to store) a set of signatures. Each signature of the set of signatures is associated with a corresponding family of IP vectors.

A disparity map generation module is configured to generate, from the input cross-spectral image pair, a plurality of unique disparity maps. Each unique disparity map of the plurality of unique disparity maps is produced by a corresponding one of the plurality of unique IP vectors. Each disparity map has an associated unique IP vector.

A fingerprint generation module is configured to generate a corresponding fingerprint for each unique disparity map of the plurality of unique disparity maps to produce a plurality of fingerprints. Each fingerprint of the plurality of fingerprints is associated with a unique IP vector of the disparity map from which the fingerprint was generated.

A correlation module is configured to correlate the fingerprint and its associated unique IP vector to a corresponding signature of the set of signatures, for each fingerprint of the plurality of fingerprints. An IP vector selection module is configured to select, as the selected IP vector, an IP vector from a family of IP vectors associated with a highest classification.

The correlation module may be further configured to rank each family of IP vectors by classification.

The correlation module may be further configured to add each unique IP vector to the family of IP vectors associated with a signature to which its fingerprint is correlated.

The family of IP vectors may include an IP vector most recently added to the family of IP vectors. The IP vector selection module may be further configured to select the IP vector most recently added to the family of IP vectors.

The family of IP vectors may include an IP vector having a shortest runtime. The IP vector selection module may be further configured to select the IP vector having the shortest runtime.

Another embodiment of the present invention provides a system for automatically selecting an IP vector for cross-spectral stereo matching. The system includes means for procuring an input cross-spectral image pair of a scene. The input cross-spectral image pair includes a visual image of the scene and an infrared image of the scene. The system also includes memory means for storing a plurality of unique IP vectors and a set of signatures. Each signature of the set of signatures is associated with a corresponding family of IP vectors. The system further includes means for generating, from the input cross-spectral image pair, a plurality of unique disparity maps. Each unique disparity map of the plurality of unique disparity maps is produced by a corresponding one of the plurality of unique IP vectors, such that each unique disparity map has an associated unique IP vector.

The system also includes means for generating, for each unique disparity map of the plurality of unique disparity maps, a corresponding fingerprint, to produce a plurality of fingerprints. Each fingerprint of the plurality of fingerprints is associated with unique IP vector of the unique disparity map from which the fingerprint was generated. The system also includes means for correlating each fingerprint of the plurality of fingerprints, and its associated unique IP vector, to a corresponding one of the signatures. An IP vector selection means selects, as the selected IP vector, an IP vector from a family of IP vectors associated with a highest classification.

Optionally, in any embodiment, the means for correlating may be further configured to rank each family of IP vectors by classification.

Optionally, in any embodiment, the means for correlating may be configured to add each unique IP vector to the family of IP vectors associated with a signature to which its fingerprint is correlated.

Optionally, in any embodiment, the family of IP vectors may include an IP vector most recently added to the family of IP vectors, and the IP vector selection means may be configured to select the IP vector most recently added to the family of IP vectors.

Optionally, in any embodiment, the family of IP vectors may include an IP vector having a shortest runtime, and the IP vector selection means may be configured to select the IP vector having the shortest runtime.

BRIEF DESCRIPTION OF THE DRAWINGS

The foregoing features of embodiments will be more readily understood by reference to the following detailed description, taken with reference to the accompanying drawings, in which:

FIG. 3F presents pseudocode for preparing a disparity map from a pair of images;

FIG. 7A schematically illustrates subsets across a range of scenes;

FIG. 7B schematically illustrates subsets for a scene, across a range of image qualities;

FIG. 8B presents pseudocode for categorizing disparity maps over a range of scenes;

FIG. 9B presents pseudocode for categorizing disparity maps of a scene over a varying image quality;

DETAILED DESCRIPTION OF SPECIFIC EMBODIMENTS

Figure 1A:
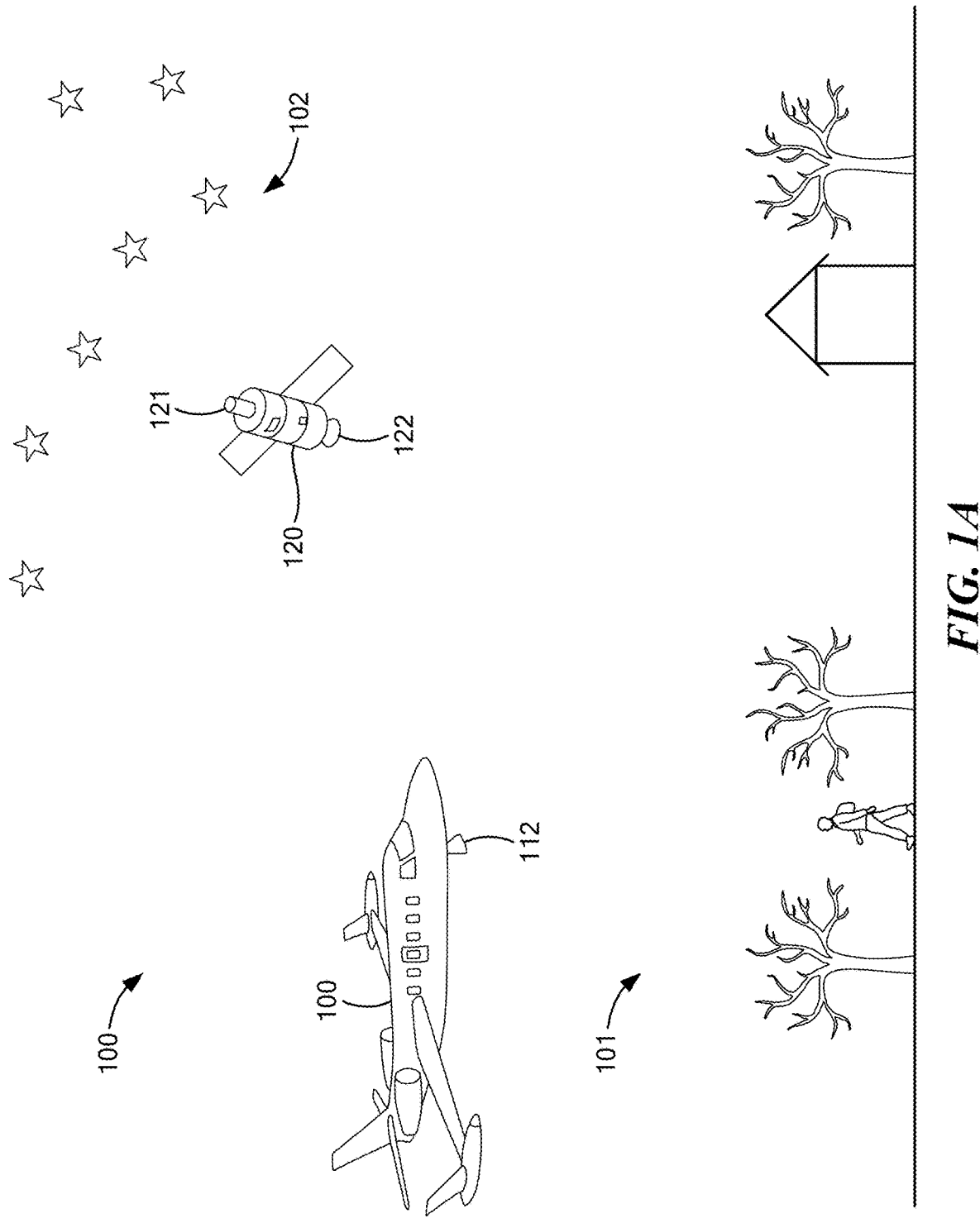
FIG. 1A schematically illustrates an embodiment of an environment in which one or more stereo matching systems may operate.

Embodiments disclose a hardware system configured for, and a method of, generating detail-rich gradient-based disparity maps in real-time using an automated gradient-based disparity map classification process that is scalable, can be used under different environment conditions with little to no restrictions, and whose level of precision can be adjusted in a scalable manner. Preferred embodiments involve highly accurate cross-spectral stereo matching methods for search and rescue operations that work during day time and night time using current and past visual and full infrared imaging to generate, classify, and identify scenes in real-time with few constraints. Such embodiments may be applied to improve the operation of existing stereo-matching systems, such as search and rescue systems, navigation systems, etc.

Pixel techniques that work well for finding differences between two visible light images do not work well to find differences between two cross-spectral images. Also, pixel techniques that work well for finding differences between two infrared images do not work to find differences between two cross-spectral images.

Definitions. As used in this description and the accompanying claims, the following terms shall have the meanings indicated, unless the context otherwise requires:

A "digital image" is a two-dimensional ("2D") pixelated image produced by an electronic camera, where the image is defined by a 2-dimensional array of pixels, and each pixel of the array of pixels has a pixel intensity proportional to the strength of radiation, e.g., optical visual radiation or infrared (IR) radiation, as the case may be, received by the pixel during image capture.

A "visual image" is an image produced from the humanly-visible optical spectrum, wavelengths from about 390 to about 700 nanometers, such as by an optical digital camera. In illustrative embodiments, the optical digital camera may be a Nikon 7100 DLSR camera body bundled with an 18-200 mm lens.

An "infrared image" is an image produced from the infrared spectrum, wavelengths from about 700 nanometers to about 1,000 nanometers, such as by an infrared digital camera. In illustrative embodiments, the infrared digital camera may be a TAMARISK 640 LWIR thermal camera.

The term "cross-spectral" describes images from different spectra, such as visual and infrared.

A "cross-spectral pair" means a pair of images, both images being of the same scene, although there may be a slight difference in point of view, such as parallax caused by a stereo camera, in which one image of the pair of images is a visual image, and the other image of the pair of images is an infrared image.

A "pixel gradient" for a pixel in a digital visual or IR image is a vector having a magnitude and optionally a direction, typically represented by an angle. The vector quantitatively indicates a magnitude, and optionally a direction, of increasing (alternatively, decreasing) pixel values (intensities) near the pixel in the visual or IR image. The gradient value indicates magnitude of the gradient, i.e., a spatial rate of change in pixel values near the pixel in the image, and the direction indicates the direction of increasing pixel intensities of the pixels around the pixel in the image.

A "histogram of gradients" (HOG) is a matrix of pixel gradients. Each pixel gradient corresponds to a pixel in a visual image or an IR image. As noted, a gradient value may also include an indication of a direction of the gradient, i.e., a direction of increasing (alternatively, decreasing) pixel values (intensities) near the pixel in the visual or IR image.

A "diversity map" (DM) is a matrix of gradient differences, i.e., differences in gradients, between a cross-spectral pair of images. Each gradient difference corresponds to a pixel in both images of the cross-spectral image pair. The diversity map indicates how different the two images are from each other. As used herein, a disparity map need not necessarily refer to depth information, as in stereo images generated for the purpose of producing a three-dimensional view, where "disparity" refers to an apparent shift in pixel or motion in a pair of stereo images.

A "set" includes at least one member.

A "stereo matching system" is a system that, in performance of its function, receives a pair of images and produces a disparity map from that received pair of images. The pair of images can, but need not, be captured from different points of view to create parallax between the two images.

FIG. 1A schematically illustrates an environment 100 in which stereo matching systems may operate. For example, but without limitation, such a stereo matching system may be in an aircraft 110 with camera 112 flying over a scene with terrain 101. Such an aircraft 110 may be a search and rescue platform using stereo matching of images of the terrain 101 in performance of its search and rescue mission. In other embodiments, the aircraft 110 may be navigating by analysis of features of the terrain 101 using camera 112, which analysis includes stereo matching. In another example, such a stereo matching system may be a spacecraft 120 navigating by observing stars 102 with camera 121. In yet another example, such a stereo matching system may be a spacecraft 120 mapping or analyzing the terrain 101 using camera 122.

Figure 1B:
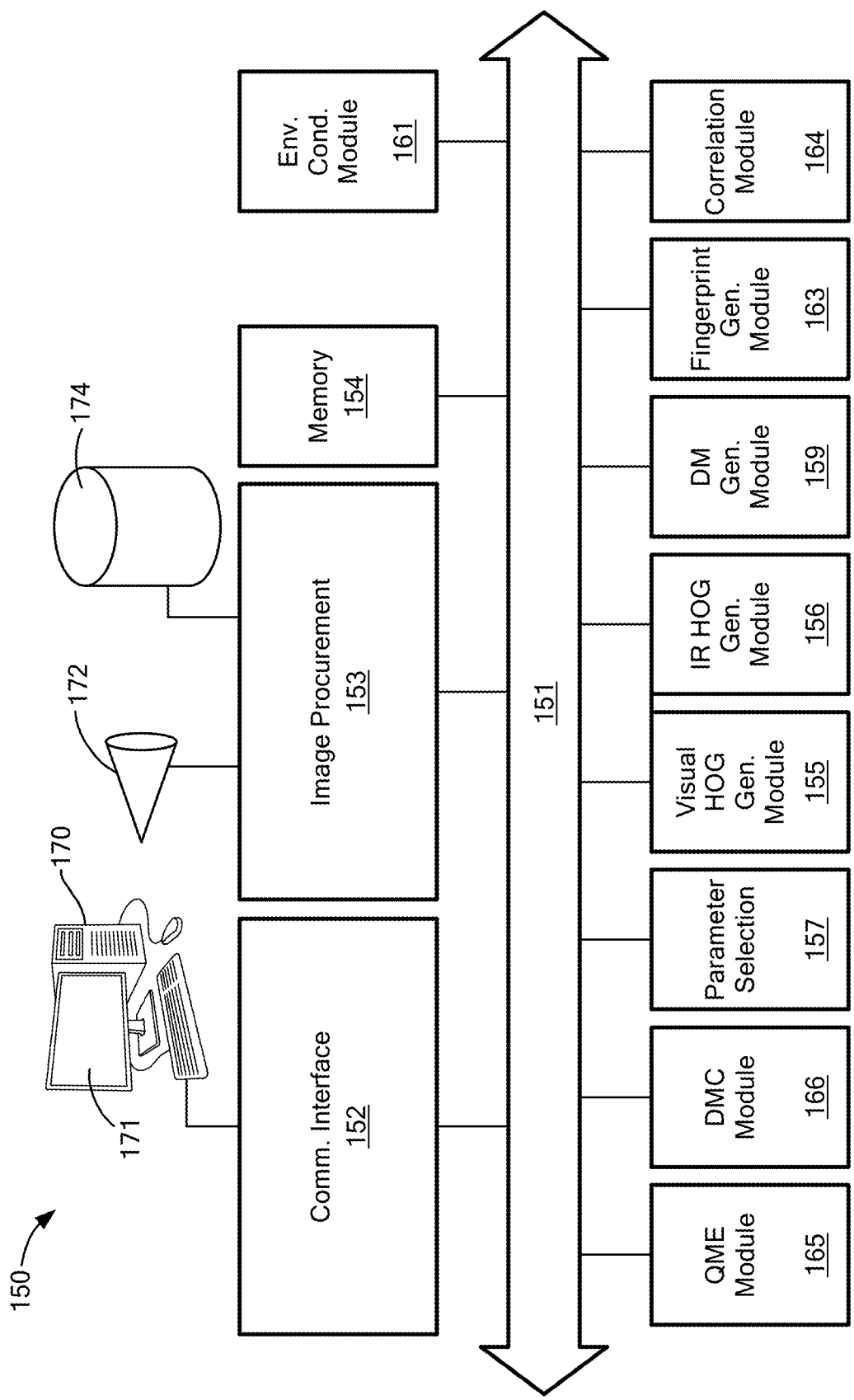
FIG. 1B schematically illustrates an embodiment of a stereo matching system.

FIG. 1B schematically illustrates a system 150 for implementing the various embodiments described herein. The system 150 includes a plurality of modules in data communication with one another via bus 151. Some or all of the system 150 may be implemented on a computer system having a microprocessor programmed with code executable on the microprocessor. Embodiments of the system 150 may have some or all of the modules schematically illustrated in FIG. 1B.

Module 152 is a communication module configured to send and receive communications to and from an external computer 170. The external computer 170 may be an operator console that provides a user interface for an operator of a stereo matching system. The user interface may include, for example, a display device 171.

Module 153 is an image acquisition module configure to acquire the images of an image pair, such as a cross-spectral image pair or other image pair to be processed by a stereo matching system. The module 153 may acquire an image from a camera system 172, which may include, for example, an optical camera to produce visual images, and an infrared camera to produce infrared images. In some embodiments, the module 153 may acquire one or more of the images of an image pair from an image database 174. For example, a stereo matching system may acquire a new infrared digital image of a scene from the camera system 172, and also acquire a visual digital image of the same scene from a previous time from image database 174. The new infrared digital image and the visual digital image from the previous time form a cross-spectral image pair of the scene.

Module 154 is a non-transient memory which may store images, image pairs, and/or code configured to execute on a processor to implement the methods and algorithms described herein.

Module 161 is an environmental conditions module configured to receive specification of environmental conditions.

Module 157 is an IP vector selection module configured to select an IP vector according to embodiments described below.

Module 163 is a fingerprint generation module configured to generate a fingerprint from a disparity map (DM).

Module 164 is a correlation module configured to correlate a fingerprint to a signature (e.g., via histogram matching, entropy, or disparity density, as described below).

Module 165 is a QME module configured to process disparity maps according to a quality metric algorithm, such as the quality metric algorithm described below.

Module 166 is a DMC module configured to process disparity maps according to a disparity map classification algorithm, such as the disparity map classification algorithm described below.

Module 157 is a parameter selection module configured to determine a set of input parameters (an IP vector) for a gradient-based cross-spectral stereo matching (GB-CSSM) algorithm as described below.

I. The Gradient-Based Cross-Spectral Stereo Matching Algorithm ("GB-CSSM")

Figure 2A:
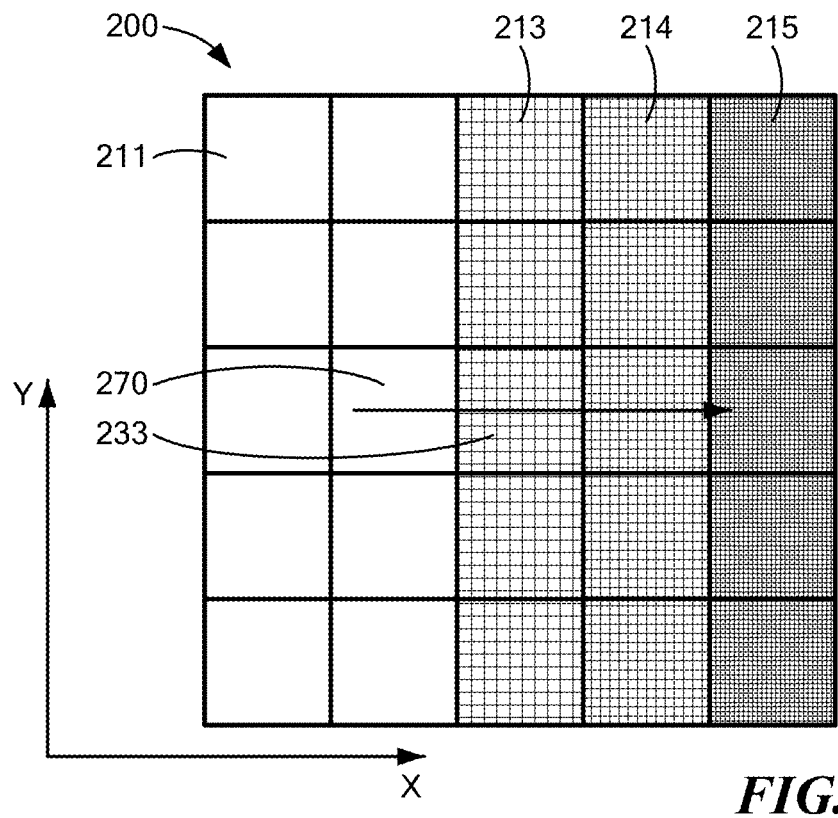
FIG. 2A schematically illustrates an embodiment of a pixel gradient.
Figure 2B:
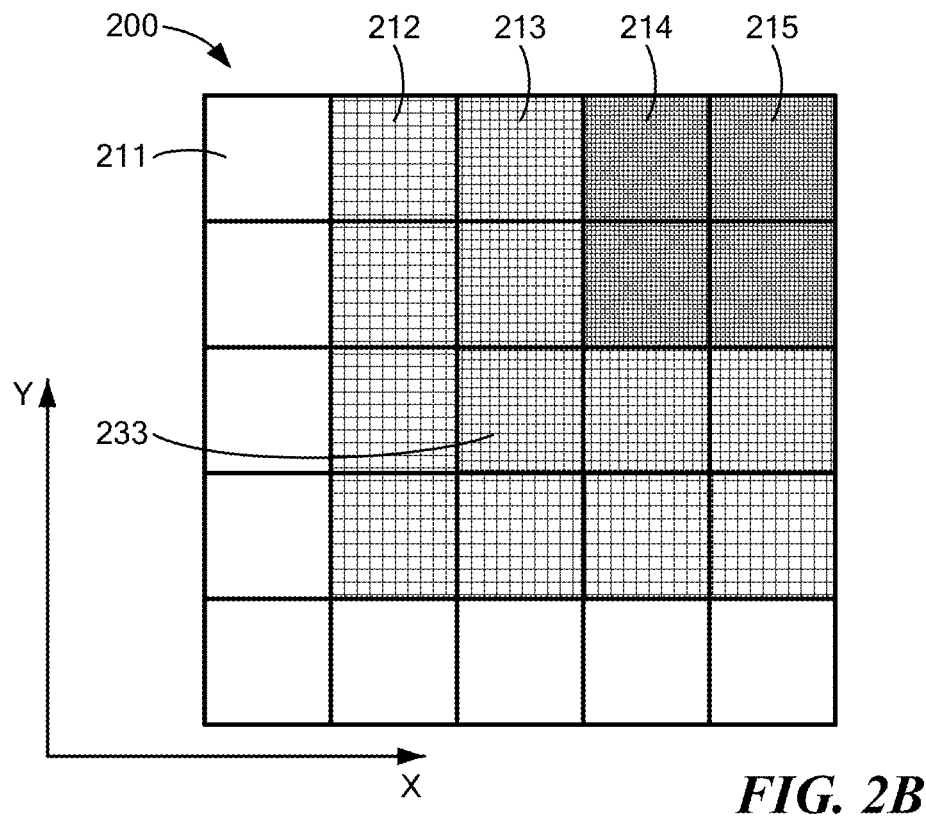
FIG. 2B and FIG. 2C schematically illustrate another embodiment of a pixel gradient, and its components.
Figure 2C:
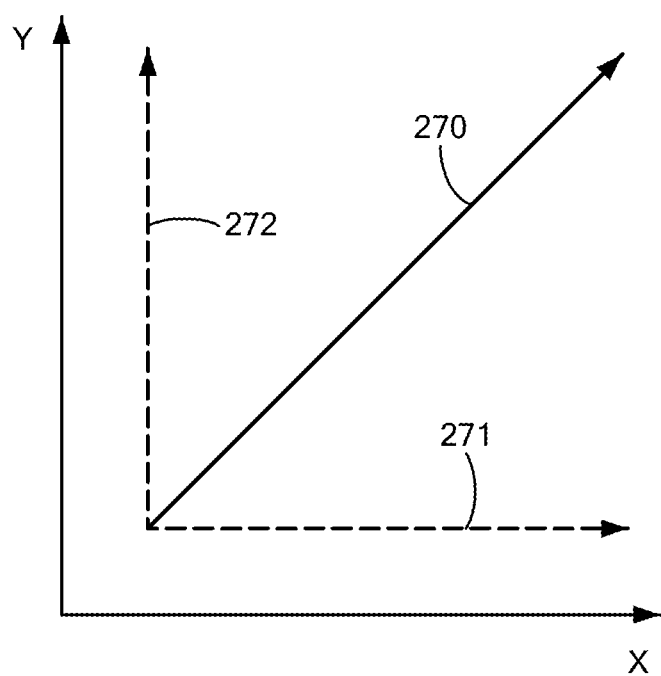
Figures 3A, 3B:
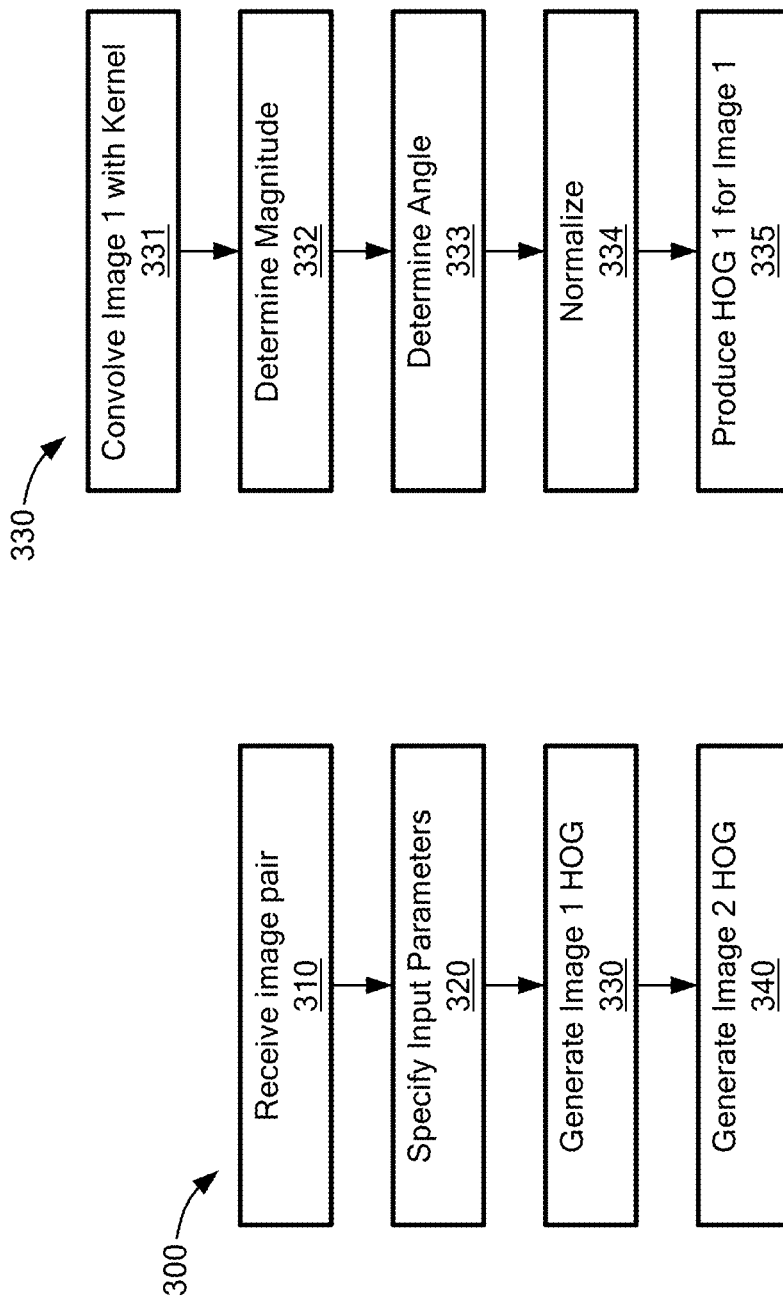
FIG. 3A is a flowchart illustrating an embodiment of a method of generating histograms of gradients.
FIGS. 3B and 3C are flowcharts illustrating embodiments of HOG generation method.
Figure 3C:
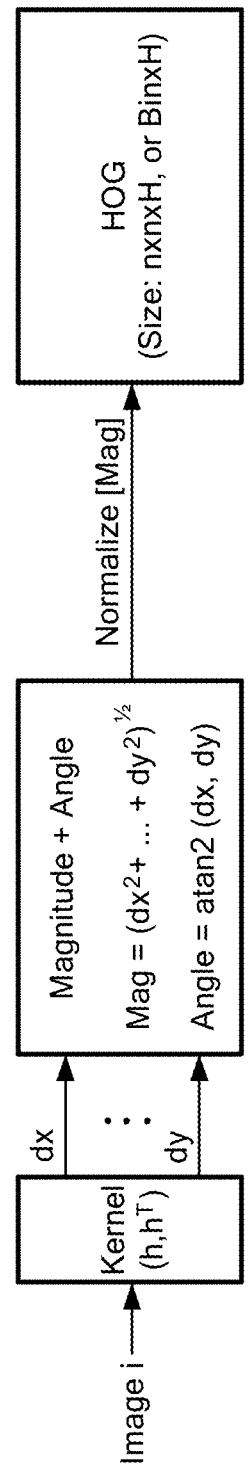

FIG. 3A is a flow chart illustrating an embodiment of a GB-CSSM algorithm 300. Details of illustrative embodiments of the gradient-based cross-spectral stereo matching algorithm are illustrated in FIG. 3B, FIG. 3C, FIG. 3D and FIG. 3E. FIG. 3F presents pseudocode for generating a disparity map from a cross-spectral image pair. Illustrative embodiments of pixel arrays and pixel gradients are schematically illustrated in FIG. 2A, FIG. 2B and FIG. 2C.

The method of algorithm 300 begins by receiving the two images of a cross-spectral image pair (step 310). Each image is an array of pixels. From those images, based on specified input parameters (step 320), the method produces for each image an array of gradients (which may be referred to as a histogram of gradients "HOG") (steps 330 and 340, respectively). The array of gradients includes a gradient corresponding to each pixel in the image from which it is produced. From the array of gradients, the method generates a cost matrix, and from that cost matrix, the method generates a disparity map corresponding to the cross-spectral image pair. These steps are described in more detail below.

A. Seven Input Parameters

The method 300 includes (step 320) specification of input parameters used in the steps of the method. In illustrative embodiments, there are seven such parameters, each described below. It should be noted that each input parameter, of the seven input parameters, may be selected or specified from among several options for said input parameter. Any option for any given input parameter may be used, in a GB-CSSM algorithm, with any option for any of the other input parameters. As a consequence, there are many possible combinations of input parameters, each such combination defining a GB-CSSM algorithm. Indeed, in one experiment for a cross-spectral image pair, combinations of input parameters were defined, and used to produce several thousand disparity maps—all for the same cross-spectral image pair.

The seven input parameters are described below. An IP vector may be composed of any combination of any of the following input parameters.

1. Gradient Orientations/Coordinate Systems

Illustrative embodiments operate on a coordinate system that, in various embodiments, has 2, 4, or 8 coordinate axes (spaced 90°, 45°, and 22.5° apart, respectively). The specification of the number of coordinate axes corresponds to one of three different types of gradient-based cost functions, respectively, with HOGs of size n×n×H gradients per image. H represents the number of bins in a histogram, and each bin has size n×n gradients. The gradient-based cost functions and their orientations are defined in Table 1.1.

TABLE 1.1

Gradient-based cost functions and their gradient orientations.

| Gradient-based Cost Functions | Gradient Orientations |
| --- | --- |
| $C_{GRAD\,(i,d)} = \|\nabla L_i - \nabla R_i - d\|_{1,2}$ | $\delta_x, \delta_y$ |
| $C_{GRAD_4(i,d)} = \|\nabla_4 L_i - \nabla_4 R_i - d\|_{1,2}$ | $\delta x, \delta\!\left(x+\frac{\pi}{4}\right), \delta y, \delta\!\left(y+\frac{\pi}{4}\right)$ |
| $C_{GRAD_8(i,d)} = \|\nabla_8 L_i - \nabla_8 R_i - d\|_{1,2}$ | $\delta x, \delta\!\left(x+\frac{\pi}{8}\right), \delta\!\left(x+\frac{\pi}{4}\right), \delta\!\left(x+\frac{3\pi}{8}\right)$ |
| | $\delta y, \delta\!\left(y+\frac{\pi}{8}\right), \delta\!\left(y+\frac{\pi}{4}\right), \delta\!\left(y+\frac{3\pi}{8}\right)$ |

Subscripts 1 and 2 refer to the $L_1$ and $L_2$ distance operation. The variable d represents the disparity.

2. Kernels

To obtain a gradient component, preferred embodiments convolve a kernel h and its transpose counterpart (hT) with an input image. Utilizing a different kernel results in a slightly different gradient component, which means magnitude gradients also vary, and each kernel changes the quality (clarity) of the disparity map produced, relative to other kernels. Preferred embodiments use one of eight different kernels, listed in Table 1.2, below.

TABLE 1.2

| Kernel Name | Kernel Implementation |
| --- | --- |
| Centered Gradient Pixels | $[-1\ \ 0\ \ 1], [-1\ \ 0\ \ 1]^T$ |
| Edge Detection Version 1 | $\begin{bmatrix} 1 & 0 & -1 \\ 0 & 0 & 0 \\ -1 & 0 & 1 \end{bmatrix}, \begin{bmatrix} 1 & 0 & -1 \\ 0 & 0 & 0 \\ -1 & 0 & 1 \end{bmatrix}^T$ |
| Edge Detection Version 2 | $\begin{bmatrix} 0 & 1 & 0 \\ 1 & -4 & 1 \\ 0 & 1 & 0 \end{bmatrix}, \begin{bmatrix} 0 & 1 & 0 \\ 1 & -4 & 1 \\ 0 & 1 & 0 \end{bmatrix}^T$ |
| Edge Detection Version 3 | $\begin{bmatrix} -1 & -1 & -1 \\ -1 & 8 & -1 \\ -1 & -1 & -1 \end{bmatrix}, \begin{bmatrix} -1 & -1 & -1 \\ -1 & 8 & -1 \\ -1 & -1 & -1 \end{bmatrix}^T$ |
| Sobel | $\begin{bmatrix} -1 & 0 & +1 \\ -2 & 0 & +2 \\ -1 & 0 & +1 \end{bmatrix}, \begin{bmatrix} -1 & 0 & +1 \\ -2 & 0 & +2 \\ -1 & 0 & +1 \end{bmatrix}^T$ |
| Sobel-Feldman operator | $\begin{bmatrix} +3 & +10 & +3 \\ 0 & 0 & 0 \\ -3 & -10 & -3 \end{bmatrix}, \begin{bmatrix} +3 & +10 & +3 \\ 0 & 0 & 0 \\ -3 & -10 & -3 \end{bmatrix}^T$ |
| Prewitt operator | $\begin{bmatrix} -1 & 0 & +1 \\ -1 & 0 & +1 \\ -1 & 0 & +1 \end{bmatrix}, \begin{bmatrix} -1 & 0 & +1 \\ -1 & 0 & +1 \\ -1 & 0 & ++1 \end{bmatrix}^T$ |
| Robert Cross operator | $\begin{bmatrix} +1 & 0 \\ 0 & -1 \end{bmatrix}, \begin{bmatrix} 0 & +1 \\ -1 & 0 \end{bmatrix}$ |

The Centered Gradient pixels kernel is the simplest and most efficient kernel and contains no smoothing, while the Edge Detection, Sobel, Prewitt and Robert Cross kernels improve the edges in an disparity map.

3. Norms

The normalization step results in magnitude gradients that exhibit better invariance to changes in illumination and shadowing. Options for norm equations are presented in Table 1.3, below:

TABLE 1.3

Norm Equations $$\|x\|_1 := \sum_{i=1}^{n} |x_i| \qquad \|x\|_2 = \sqrt{\sum_{i=1}^{n} |x_i|^2}$$

$L_1$ Unit Norm $\qquad L_2$ Unit Norm $$\|x\|_\infty := \max\{|x_1|, \ldots, |x_n|\}, \qquad \|x\|_\infty := \min\{|x_1|, \ldots, |x_n|\}$$

Maximum Norm $\qquad$ Minimum Norm

Distance Operation Equations $$d_1(p, q) = \|p - q\|_1 = \sum_{i=1}^{n} |p_i - q_i|,$$

where (p, q) are vectors p = (p$_1$, . . . , p$_n$) and q = (q$_1$, . . . , q$_n$), respectively.
$L_1$ distance $$d_2(p, q) = \sqrt{(q_1 - p_1)^2 + (q_2 - p_2)^2}$$

where (p, q) are vectors p = (p$_1$, p$_2$) and q = (q$_1$, q$_2$), respectively.
$L_2$ distance Normalization means adjusting values measured on different scales to a notionally common scale. By normalizing a matrix of HOGs (HOG1), we can compare normalized HOGs, for example norm (HOG1) and norm (HOG2), that we know have similar scales, with a reduced number of outliers. By normalizing, or having a normalized matrix of gradient differences (a disparity maps), we can compare among different normalized disparity maps knowing that the disparities in scenes of variable quality and different scenes will have similar scales, with no outliers. Normalization is useful for DM matching and/or classification.

The normalization step has options. The more complex the equation, the more accurate or trustworthy the normalized results would be. For example, to improve runtime or execution time, one could use a less complex equation that is somewhat less accurate, but that yields results (disparity maps) that are still valid and discernible. This way we can meet time constraints, in terms of execution time, and also use less expensive or simpler hardware with less stringent specifications or that consumes less power. In terms of complexity: L2>L1>max>=min.

4. Distance Operation

The distance operation takes two HOGs as inputs and compares them to generate a disparity map. The distance operation evaluates the gradient absolute difference between two gradients. There are n×n gradients in matrices HOG1 and HOG2. Applying the distance operation to both matrices results in a matrix containing n×n absolute values. Each value is a gradient difference. The resulting matrix is called a disparity map.

As discussed with respect to Table 1.3, two options are provided for the distance operation input parameter. Each option's formula/equation produces a slightly different absolute gradient difference, where L2 is more complex, i.e., requires more computation steps to produce a result, than L1, and both L1 and L2 contribute to evaluating precise disparity maps. One option can be chosen over the other one, for example based on performance considerations. Other empirical evidence may be used to select one of the options as being better suited for specific climate and/or terrain conditions, for example.

In the interest of clarity, a cost matrix is a disparity map with no optimization, i.e., a cost matrix is a disparity map whose gradient differences have not been optimized or improved. FIG. 3E includes an optional optimization step that performs semi-global matching (SGM), more global matching (MGM) or another suitable optimization algorithm, to improve the quality or performance of the gradient differences. Applying SGM to each gradient difference in a cost matrix removes outliers and improves clarity, quality and/or details of the scene the cost matrix represents. A disparity map matrix can be a cost matrix or an optimized cost matrix.

Furthermore, the optional optimization step may be considered as an eighth input parameter combination, with two options: SGM and MGM. SGM is described in more detail at core.ac.uk/download/pdf/11134866.pdf, and MGM is described in more detail in www.bmva.org/bmvc/2015/papers/paper090/abstract090.pdf, the entire contents of each of which are hereby incorporated by reference herein, for all purposes. Although both algorithms improve disparity maps, SGM and MGM have different complexities, such as different results and different execution times. In general, MGM is more efficient and offers better results than SGM.

Cost matrices generated by the GB-CSSM algorithm described herein, even without SGM or MGM, consistently yield scenes that exceed the quality level of scenes obtained by Pinggera in his original black box algorithm, which depends on SGM.

5. Bin Size

A histogram of gradients consists of n×n gradients. A bin contains a group of adjacent gradients, and because the size of bins in a histogram can vary, the number of bins in a histogram can also vary. For example, in FIG. 2A, a bin 200 includes 25 pixels in a 5 pixel×5 pixel array. The size and number of bins, as shown in FIG. 3G, directly affects the GB-CSSM algorithm runtime.

6. Order of Bin Evaluation

A preferred embodiment specifies an order in which to process bins when normalizing every gradient in an HOG and when evaluating the cost matrix. The order of bin evaluation may be selected, for example based on bin matrix size and available hardware, to improve real-time execution of HOGs, cost matrices and disparity maps. The order of bin evaluation may be horizontal, vertical or diagonal. Thus, the order of bin evaluation may be one of: horizontal, vertical, and diagonal order.

The order in which bins are evaluated may be selected to enable rapid processing of gradients in a HOG matrix, rapid processing of absolute gradient differences in a cost matrix and rapid processing of optimized absolute gradient differences in a disparity map matrix. Rapid processing refers to parallel processing of data contained in bins (bins are evaluated in parallel) by means of parallel programming and extra hardware components, and by using pipelining to increase the throughput of bins execution. For example, in a matrix of size 3 by 3 bins, where the size of each bin is not important, diagonal execution of the bins may take only two time steps to evaluate, but requires five parallel components (evaluation of five bins at the same time) to achieve this fast processing time. Similarly, vertical execution of bins in the same 3 by 3 bin matrix may take three time steps to evaluate, but only requires three hardware components. In other words, the order of bin evaluation may be selected to enable and contribute to improved real-time execution of HOGs, cost matrices and disparity maps, at the cost of extra hardware and/or software overhead.

Furthermore, selecting the order of bin evaluation facilitates easily adapting the methods described herein to meet different time constraints or requirements. The order of bin evaluation input parameter works together with the bin size input parameter. Together, these parameters provide ample and flexible processing alternatives aimed at improving performance, ex. runtime or execution time, of our GB-CSSM method and system.

7. Area Overlap

The area overlap consists of the number of shared magnitude gradients between bins. It influences each gradient in an HOG, and varying sizes result in disparity maps of different quality. FIG. 3H shows an example of the different ways bins can overlap.

B. Generation of a Histogram of Gradients ("HOG")

The algorithm 300 includes (steps 330 and 340) generation of a histogram of gradients (a "HOG") for each image of the cross-spectral image pair. For each image, the HOG includes a matrix of gradient values, each gradient value in the matrix corresponding to a pixel of the image. A HOG is not a representation of a distribution of disparity data. In FIG. 3A, generation of the HOG for the first image (the Image 1 HOG) is illustrated at step 330, and generation of the HOG for the second image (the Image 2 HOG) is illustrated at step 340. The process for generating a HOG is the same for each image, and is illustrated in FIG. 3B, using the Image 1 HOG as an example. An alternate illustration of the method of generating a HOG is presented in FIG. 3C.

Referring now to FIG. 3B, generation of a HOG begins by convolving (step 331) the image (one of the images of the cross-spectral pair) with the kernels specified in step 320. The convolution process produces, for each pixel in the image, the magnitude of a pixel gradient specific to that pixel. In some embodiments, the convolution also produces an angle of the pixel gradient.

For reference, illustrative pixel gradients 270 are schematically illustrated in FIG. 2A, FIG. 2B and FIG. 2C. In general, for each pixel in an image, there may be defined a gradient (the pixel gradient). The pixel gradient for a pixel in a digital image is a vector having a magnitude and an angle, wherein the angle indicates the direction of increasing pixel intensities of pixels around the given pixel, and the magnitude is a quantitative indication of said increasing pixel intensities.

A simple example of a pixel gradient 270 is schematically illustrated for a pixel 233 within an array 200 of pixels in FIG. 2A, although the gradient is not part of the array and is not visible in the array or the image of which the array is a part. In this illustrative example, the array 200 of pixels includes 25 pixels in a 5×5 matrix. The array 200 of pixels may be referred to as a "bin," and is in illustrative embodiments a subset of the pixels of the image being processed. In general a bin includes pixels from an image. In preferred embodiments, the pixels of the array 200 are a sub-set of the pixels of an image, but may include all of the pixels of the image.

In the example of FIG. 2A, the intensity of each pixel is indicated by its shading. For example, pixel 211 is lightly shaded, as are all pixels in its column, and in the adjacent column. Pixel 213 has an intensity greater than the intensity of pixel 211, as indicated by its darker shading. Pixel 214 has an even greater intensity than pixel 213, as indicated by its darker shading. Pixel 215 has an even greater intensity than pixel 214, as indicated by its darker shading, which is the darkest (greatest intensity) of all of the pixels (211-215) in the top row of the array 200. The pixels of the other rows follow the same pattern. Therefore, it can be seen that a pixel gradient 270 identifying the direction of increasing pixel intensities (based on all 25 of the pixels in the pixel array 200) extends left to right (in this Figure), in the +X direction. The length of the pixel gradient 270 is proportional to, and indicates, the magnitude of, the increase in pixel intensities.

A second example of a pixel gradient 270 is schematically illustrated for the pixel 233 within the array 200 of pixels in FIG. 2B. In this example, the intensity of the pixels in the array 200 increases in the direction of the upper-right corner. Consequently, the pixel gradient has a direction at an angle increasing towards the upper right. Again, the length of the pixel gradient 270 is proportional to, and indicates, the magnitude of, the increase in pixel intensities.

The pixel gradient 270 may be represented by gradient components (e.g., component vectors), parallel to the X and Y axes, respectively. FIG. 2C schematically illustrates an X-axis gradient component 271 (parallel to the X axis), and a Y-axis gradient component 272 (parallel to the Y axis). A gradient component (or "gradient orientation") refers to the gradient evaluated along the coordinate axes of a coordinates system. Illustrative embodiments evaluate one gradient component per coordinate axes to compute the magnitude. For a coordinate system with 2 coordinate axes, illustrative embodiments use gradient components δx and δy to evaluate the magnitude gradient of a pixel as follows:

Gradient component δx=I*h; and

Gradient component δy=I*hT

In the foregoing, Kernel h represents the 0° to 180° coordinate axes (i.e., the horizontal x axis), and hT represents the kernel h multiplied with a rotational matrix by a transpose of 90° to obtain the gradient component along the 90° to 270° coordinate axes (i.e., the vertical y axis).

For each pixel in a given bin of a given image (the bin being an array of pixels 200 that is a subset of the pixels of the image), convolution with the kernel yields the X-axis gradient component 271 and the Y-axis gradient component 272 for that pixel. The process is repeated for each pixel in the array 200, and each pixel in the image, to produce a corresponding set of X-axis gradient components 271 and Y-axis gradient components 272.

Returning to FIG. 3B and FIG. 3C, after convolving the image with the kernel, the X-axis gradient component 271 and the Y-axis gradient component 272 for each pixel are used to calculate the magnitude (step 332) and angle (step 333) for that pixel's pixel gradient.

Determine Magnitude Gradient

A magnitude gradient is the basic element in every HOG, and is calculated at step 332. Mathematically, it refers to the result obtained by calculating the square root of the sum of squared gradient components, where the number of gradient components varies depending on the number of coordinate axes of the coordinate system under evaluation:

$$\text{Magnitude gradient} = \overrightarrow{\delta x^2 \ldots + \delta y^2}$$

As the number of coordinate axes increases, the resulting magnitude becomes more resilient to illumination changes. The most common coordinate system has only two axes, x and y, which divide the coordinate system into 4 quadrants. Other embodiments use quadrants instead, in which x, (x+45°), y, and (y+45°) constitute the coordinate axes, and the gradient components are $\delta x$, $\delta(x+45°)$, $\delta y$, and $\delta(y+45°)$.

The set of magnitude gradients (or "magnitudes") (produced for each of a corresponding set of pixels in the array 200) may be referred to as a "Magnitudes Matrix."

Determine Angle Orientation

Some embodiments calculate an angle orientation of the pixel gradient 270. The angle orientation of the pixel gradient 270 is defined as, and at step 333 is calculated as:

$$\text{Angle Orientation } \theta = \text{atan } 2(\partial y, \partial x)$$

The set of angle orientations (produced for each of a corresponding set of pixels in the array 200) may be referred to as an "Angle Matrix."

Normalize

After calculating the magnitude gradient and angle orientation for the pixel gradient for each pixel in the array 200, the algorithm 330 normalizes the magnitude gradients at step 334.

Produce HOGs

Then, at step 335, the method 330 produces the HOG for the image, the HOG being an array of magnitude gradients and angle orientations corresponding, respectively, to the pixels of the array 200.

Returning to FIG. 3A, the algorithm 300 generates a HOG (Image 2 HOG) for the second image of the cross-spectral image pair (step 340). The process for generating the Image 2 HOG is illustrated by FIG. 3B, as described above.

Distance Operation

Figure 3D:
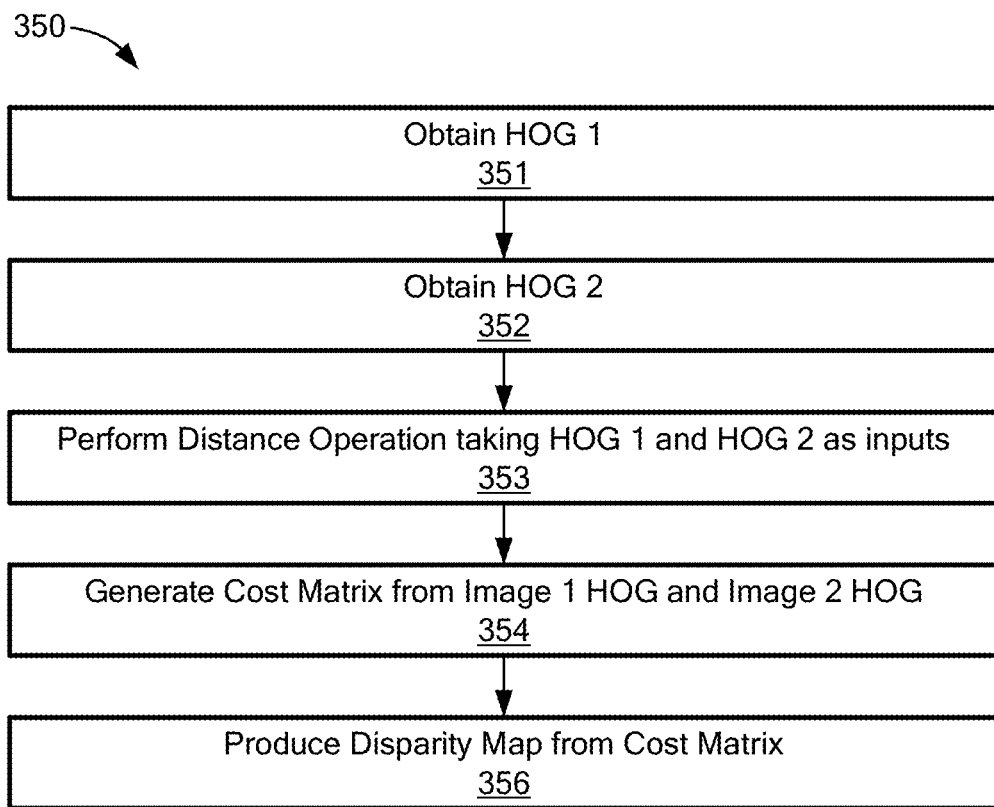
FIG. 3D is a flowchart illustrating an embodiment of disparity map generation method.
Figure 3E:
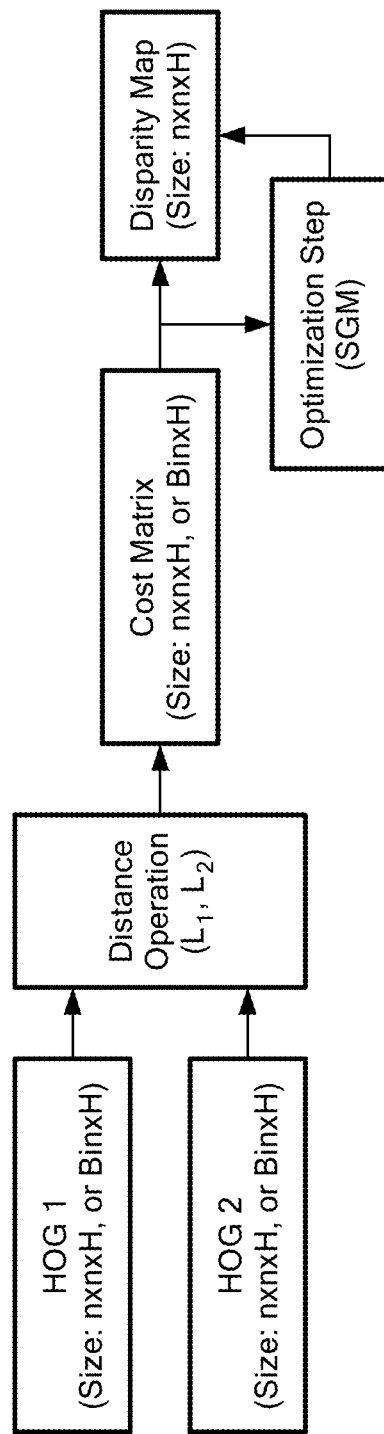
FIG. 3E is an alternate flowchart illustrating an embodiment of disparity map generation method.
Figure 3G:
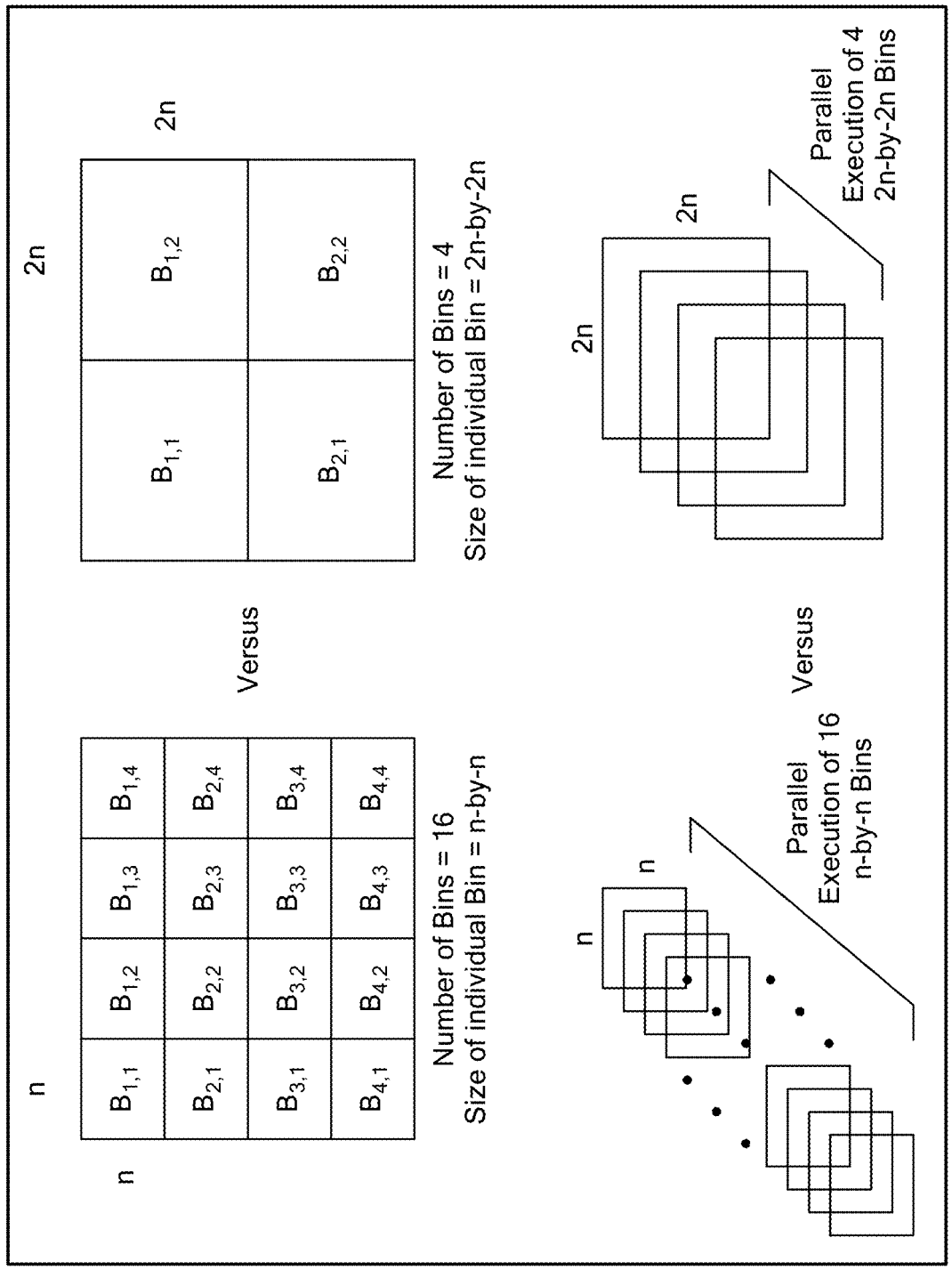
FIG. 3G schematically illustrates bin sizes and their parallel execution.
Figure 3H:
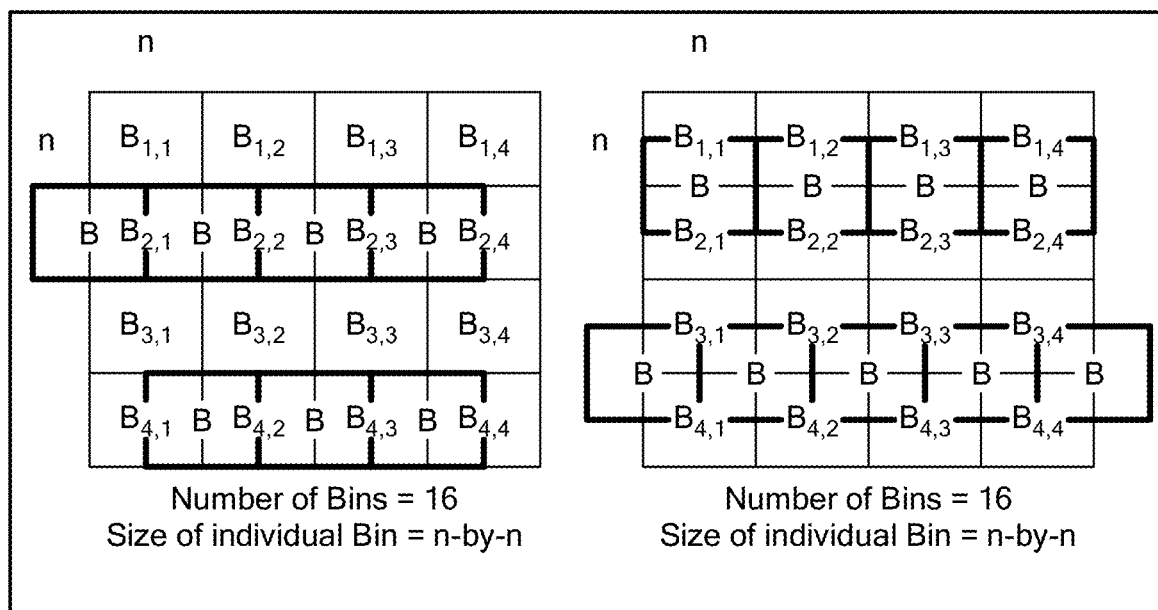
FIG. 3H schematically illustrates overlapping areas among bins.

FIG. 3D schematically illustrates a method 350 for generating a disparity map. After generating a HOG for each image of the cross-spectral image pair (i.e., the Image 1 HOG (step 351) and the Image 2 HOG (step 352)), step 353 of the method 350 next performs a distance operation, taking the Image 1 HOG and the Image 2 HOG as inputs.

Cost Matrix

Next, at step 354, the method generates a cost matrix from those HOGs.

Produce Disparity Map

Then, at step 356, the method produces a disparity map from the cost matrix.

II. Fingerprints

A disparity map can be characterized by a histogram of its disparities (which is not the same as an array of gradients, as described above).

A disparity map includes a set of disparities. Each disparity in a disparity map has a quantitative value (a length or distance), and the quantitative values collectively define a set of quantitative values corresponding to the set of disparities. The smallest disparity (i.e., the disparity with the smallest quantitative value) and the largest disparity value (i.e., the disparity with the largest quantitative value) define the range of the set of quantitative values. The quantitative value of each of the other disparities falls within the range of the set of quantitative values.

The set of disparity values in a disparity map can be used to define a histogram, which acts as a unique identifier, and may be referred to as a fingerprint for the disparity map from which it was generated. Disparities in a disparity map may be pixel-based disparities, gradient-based disparities or other types of disparities. When these disparities are organized in a histogram, the histogram exhibits a unique distribution of the disparities. This unique distribution of disparities is referred to as a fingerprint of the disparity map.

Figure 4A:
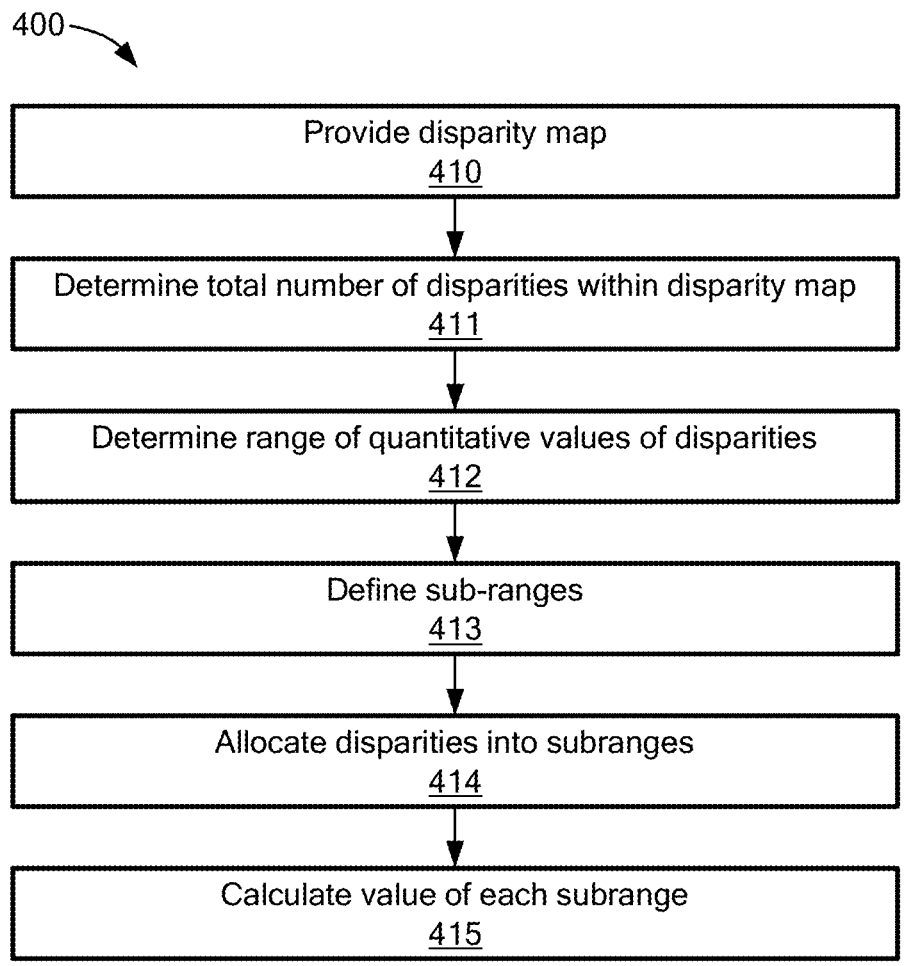
FIG. 4A is a flowchart illustrating a method of creating a fingerprint histogram.
Figure 4B:
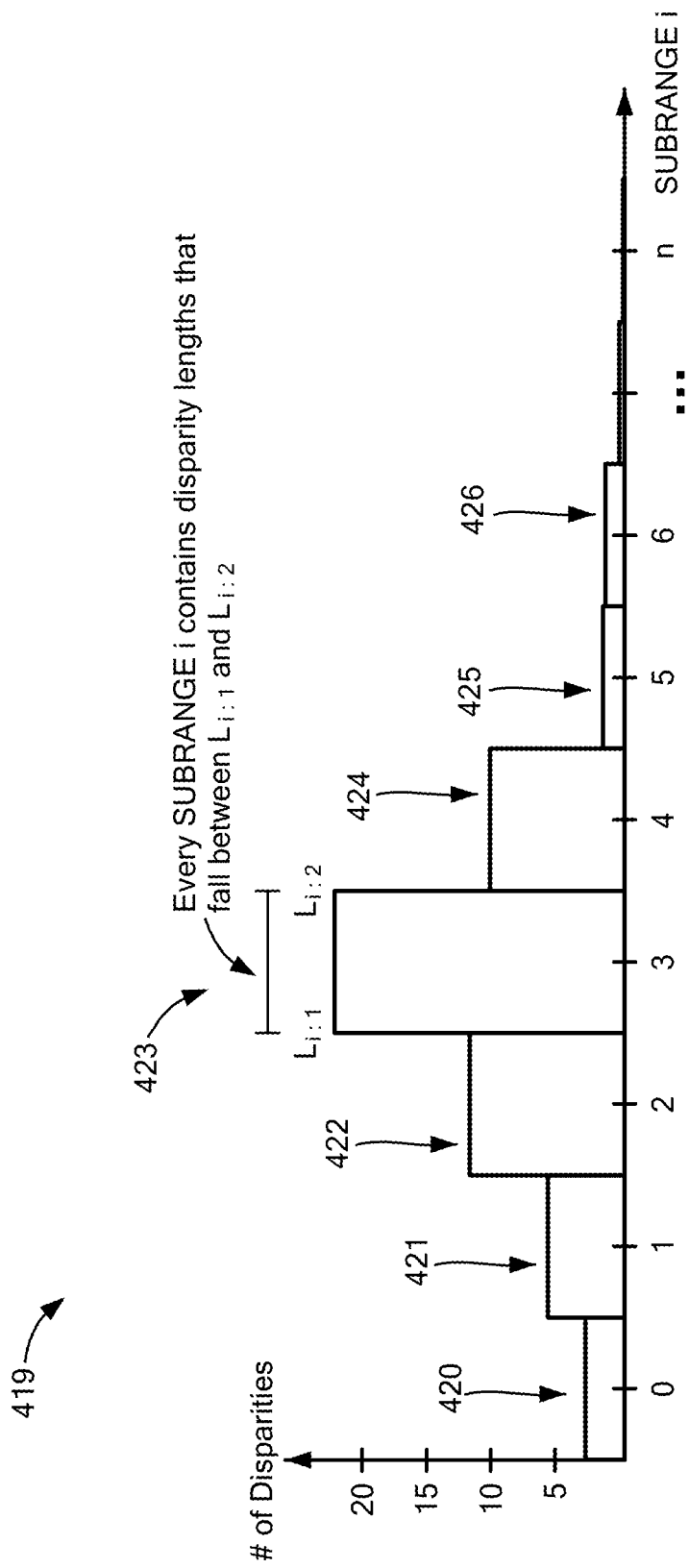
FIG. 4B schematically illustrates an embodiment of a fingerprint histogram.
Figure 4C:
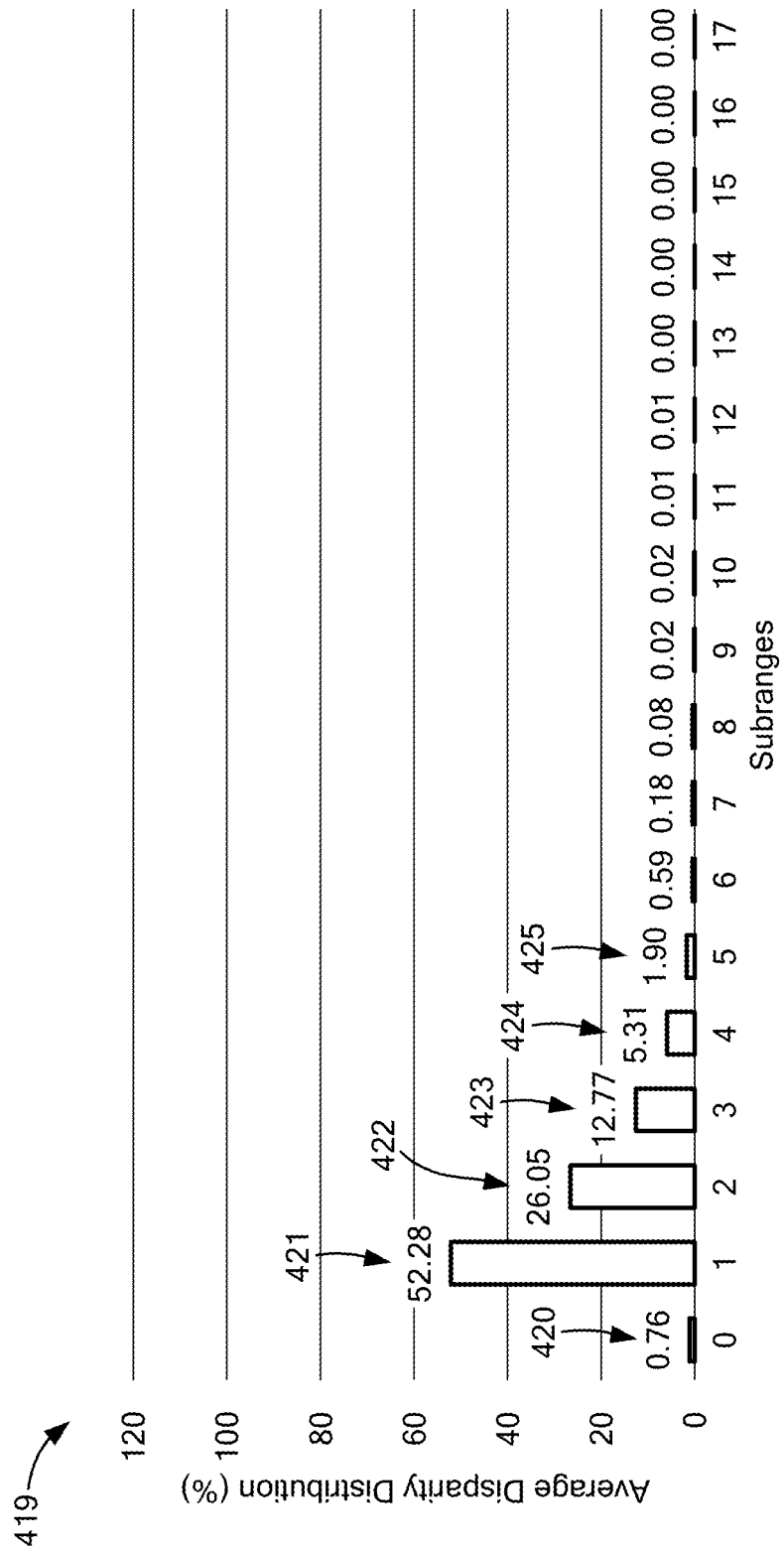
FIG. 4C schematically illustrates another embodiment of a fingerprint histogram.

An illustrative method 400 of creating such a fingerprint is illustrated in the flowchart of FIG. 4A, and illustrative embodiments of fingerprints, prepared from a disparity map according to the foregoing method, are presented in FIG. 4B and FIG. 4C.

At step 410, the method obtains a disparity map having a plurality of disparities, and at step 411 the method determines the total number of disparities within the disparity map.

At step 412, the method determines the range of quantitative values of those disparities.

At step 413, the method defines a plurality of sub-ranges within the range of the set of quantitative values. Each sub-range may be represented as a bar in a bar graph histogram. In illustrative embodiments, the number of sub-ranges (N) is at least two, and less than or equal to the number of disparities in the disparity map. In preferred embodiments, the number of sub-ranges (N) is at least eighteen (18).

Each sub-range defines a bar of a histogram 419 in FIG. 4B, and each quantitative value from the set of quantitative values falls into one of the sub-ranges 420-426. For example, sub-range 423 includes disparities having quantitative values between length L1 and length L2. Each sub-range 420-426 is a segment of the fingerprint (histogram).

At step 414, the method allocates each quantitative value from the set of quantitative values into one of the sub-ranges 420-426. For example, all disparities having quantitative values between length L1 and length L2 are allocated to sub-range 423 (FIG. 4B).

Then, at step 415, the method computes the value of each sub-range 420-426. In preferred embodiments, the value of each sub-range is the number of quantitative values in that sub-range, multiplied by 100, and divided by the total number of disparities within the disparity map. For example, if the total number of disparities within the disparity map is 587, and if sub-range 423 includes 64 quantitative values, then the value of sub-range 423=(64)(100)/587=6400/

587=10.9 percent. A fingerprint histogram in which each sub-range 420-426 has a value as described above is schematically illustrated in FIG. 4C.

Some embodiments compare one histogram to another histogram to determine whether the histograms match. For example, as described in more detail below, some embodiments determine whether a fingerprint histogram matches a signature histogram.

Figure 4D:
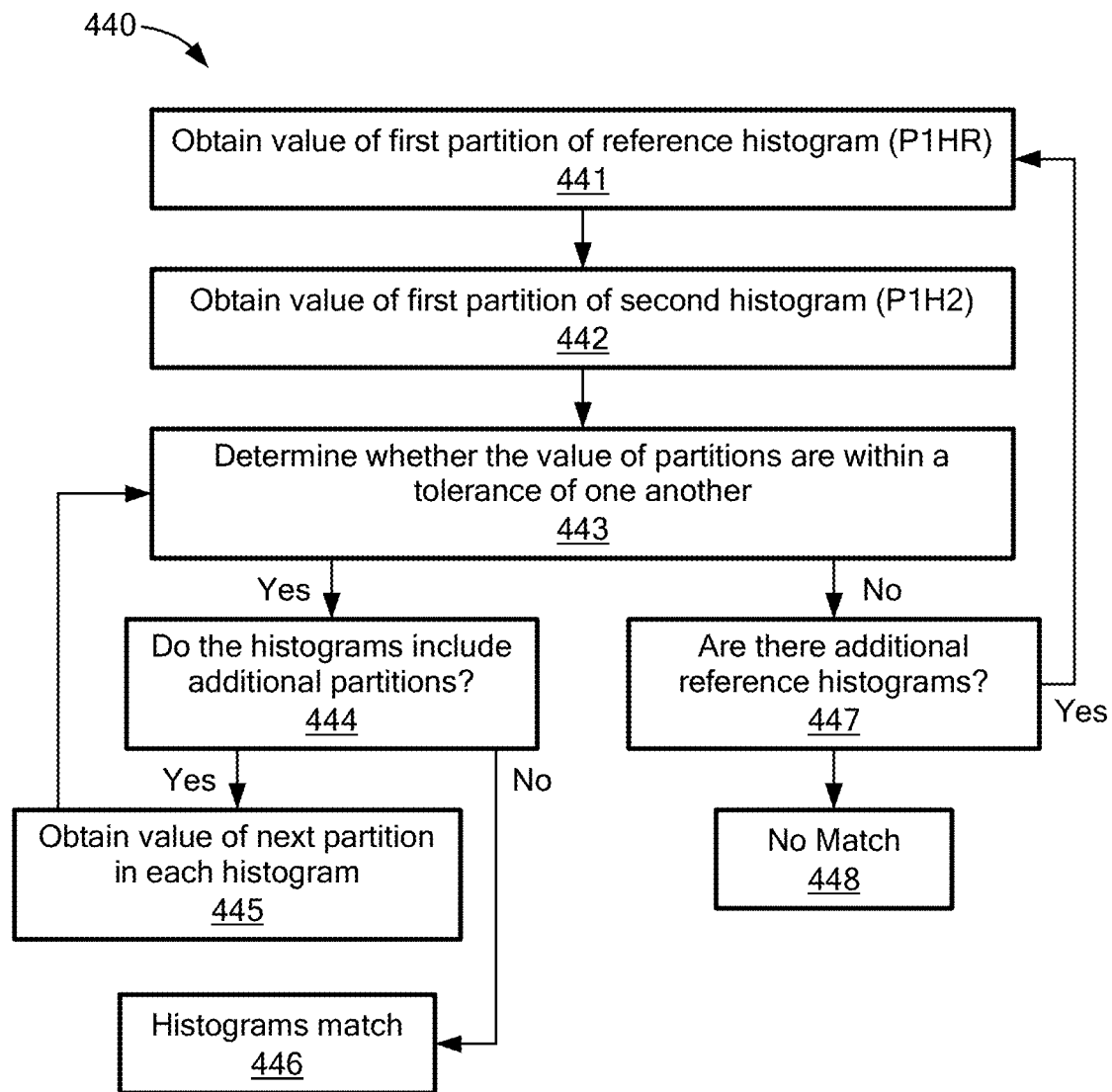
FIG. 4D is a flowchart illustrating a method of determining whether a histogram matches another histogram.

A method 440 of determining whether a histogram (in this example, a reference histogram) matches another histogram (in this example, a second histogram) is illustrated by the flowchart in FIG. 4D.

In preferred embodiments, a fingerprint histogram is compared to a signature histogram by comparing the value of one or more partitions of the reference (i.e., the value of one or more bars of the fingerprint histogram) to corresponding partitions of the second histogram (i.e., the corresponding bars of the signature histogram). The second histogram is deemed to match the reference histogram when the value of each partition (bar) of the fingerprint histogram matches the value of the corresponding partition (bar) of the signature histogram. The value of a partition (bar) of a fingerprint histogram matches the value of the corresponding partition (bar) of the signature histogram when the value of a partition (bar) of a fingerprint histogram is within a threshold percentage of the value of the corresponding partition (bar) of the signature histogram. For example, in an illustrative embodiment, if the value of partition (bar) of a fingerprint histogram is 0.0500, and the threshold percentage is 10 percent (10%), then the value of corresponding partition (bar) of the signature histogram matches the partition (bar) of a fingerprint histogram if the value of the corresponding partition (bar) of the signature histogram is 0.0500+ or − ten percent (i.e., 0.0450<value of the corresponding partition (bar) of the signature histogram<0.0550). In preferred embodiments, the threshold may have a value between zero percent (0%) and twenty percent (20%), inclusive (examples include: 1%, 2%, 3%, 4%, 5%, 6%, 7%, 8%, 9%, 10%, 11%, 12%, 13%, 14%, 15%, 16%, 17%, 18%, 19%, and 20%).

Turning to FIG. 4D, at step 441, the method 440 obtains the value of the first partition of the reference histogram. Taking the histogram 419 (FIG. 4B) as an example, the first partition would be partition 420.

In addition, at step 442 the method obtains the corresponding value of the first partition of the second histogram.

At step 443, the method determines whether the values of the two partitions are within a threshold percentage of one another.

If so, then the method determines whether the reference histogram and second histogram include additional partitions (step 444). If so, the method obtains the value of the next partition (step 445) in each of the reference histogram and the second histogram, and again determines whether the values of the two partitions are within a threshold percentage of one another (step 443). This process continues until either there are no additional partitions in the reference histogram and the second histogram, or the process finds a pair of partitions that are not within the threshold percentage of on another (in which case the reference histogram and second histogram do not match). If there are no additional partitions in the reference histogram and second histogram, and all of the partitions have been determined to match one another (i.e., each set of corresponding partitions is determined, at repeated steps 443, to be within a threshold percentage of one another), then the histograms are determined to match at step 446.

If, at any occurrence of step 443, the values of the two partitions are not within the threshold percentage of one another, then the two histograms do not match, and the method proceeds to step 447 to determine whether there are other reference histograms to which the second histogram can be compared. If so, the method loops back to step 441 and begins again for the next reference histogram. If not, then all the available reference histograms have been compared to the second histogram, and none of those available reference histograms matches the second histogram, and so the method concludes that the second histogram does not match any reference histogram (step 448).

III. Organizing Disparity Maps and IP Vectors; a 3D Pareto Frontier

Embodiments described herein present methods of automatically and objectively (i.e., without human analysis of disparity maps produced by combinations of input parameters) assessing the quality of disparity maps. Such embodiments enable a computer to perform functions in an objective manner, which functions would otherwise require subjective human judgment, and which functions were never before possible in a computer.

Where more than one disparity map is produced for a given cross-spectral image pair (i.e., each produced the GB-CSSM using a corresponding IP vector), each such disparity map may be evaluated, and the results of such evaluations compared to determine the highest quality disparity map(s) and the sets of input parameters corresponding, respectively, to those highest quality disparity map(s). In some embodiments, the set of input parameters corresponding to a selected one of the highest quality disparity maps may be specified as the set of specified input parameters for creating disparity maps from future sets of cross-spectral image pairs.

Figure 5A:
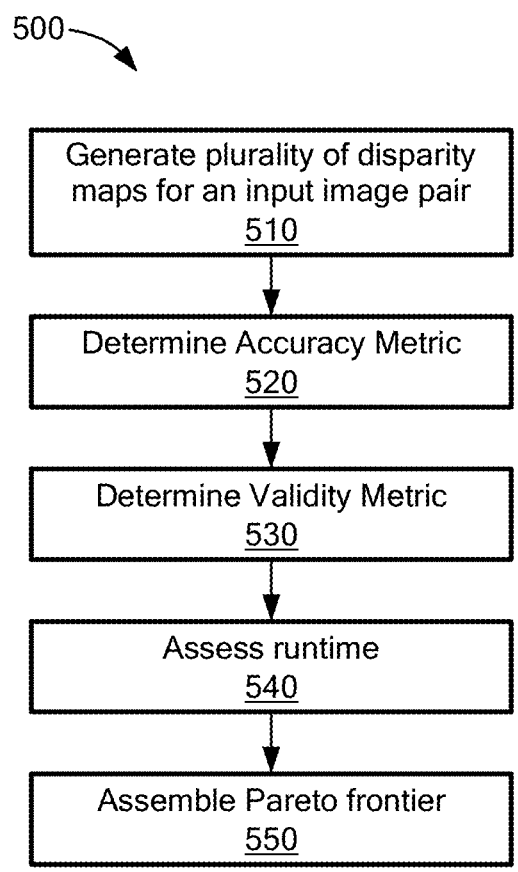
FIG. 5A is a flowchart of a method of creating a 3D Pareto frontier from a plurality of disparity maps.

FIG. 5A schematically illustrates a method 500 of assessing the quality of a disparity map, produced by a corresponding IP vector, for a pair of input images.

At step 510, the method generates a plurality of unique disparity maps for an image pair. Each unique disparity map of the plurality of disparity maps is produced from the same image pair using the GB-CSSM algorithm and a corresponding unique IP vector. In illustrative embodiments, all possible combinations of the seven input parameters are used to create a plurality of IP vectors, and each of those IP vectors is used to generate a corresponding plurality of disparity maps. As described below, the method then organizes the plurality of disparity maps along a Pareto frontier based on metrics of accuracy, validity, and runtime (computational cost).

A. Accuracy and Validity as Objective Metrics

Illustrative embodiments assess a disparity map (and by association, the IP vectors used to create that disparity map) by objective metrics of accuracy and validity.

1. Accuracy:

At step 520, the method objectively and automatically determines an accuracy metric for each of the disparity maps.

The accuracy of a disparity map refers to a measure of how closely the disparity map resembles the images of the input pair of images. While a human may be able to subjectively evaluate accuracy of a DM, and order the disparity maps by accuracy, preferred embodiments include an automated, objective process.

More specifically, to assess the accuracy of the disparity maps, the method sums, for each disparity map in the plurality of disparity maps, all of the disparities in the corresponding Cost Matrix. The method then specifies the disparity map having the smallest sum as the most accurate disparity map, and specifies the disparity map with the largest sum as least accurate disparity map. FIG. 5D schematically illustrates an embodiment of a plurality of disparity maps ranked by accuracy.

2. Validity

At step 530, the method objectively and automatically determines a validity metric for each of the disparity maps.

The validity of a disparity map refers to a measure of the how recognizable identifying structures (groups of gradient differences) are in a scene. While a human may be able subjectively evaluate validity of a DM, and order the disparity maps by validity, preferred embodiments include an automated, objective process.

More specifically, to assess validity, the method uses a rank transform, based on the number of disparities in a block (i.e., bin) whose value is less than the center disparity. A small rank per block means disparities are predominantly large within the block, so less validity. A large rank per block means disparities are predominantly small within the block, so high validity. The method sums the ranks in every disparity map. The disparity map with the largest sum represents the disparity map with highest validity, and the disparity map with the smallest sum represents the disparity map with the lowest validity. FIG. 5E schematically illustrates an embodiment of a plurality of disparity maps ranked by validity.

B. Runtime Assessment

Runtime is a measure of how long the GB-CS SM algorithm takes to execute on an integrated circuit configured to execute it, or on a computer processor programmed to execute it. The method also measures the runtime for the GB-CS SM algorithm for each of the plurality of disparity maps (step 540). FIG. 5C schematically illustrates an embodiment of a plurality of disparity maps ranked by runtime.

C. A 3D Pareto Frontier

Figure 5B:
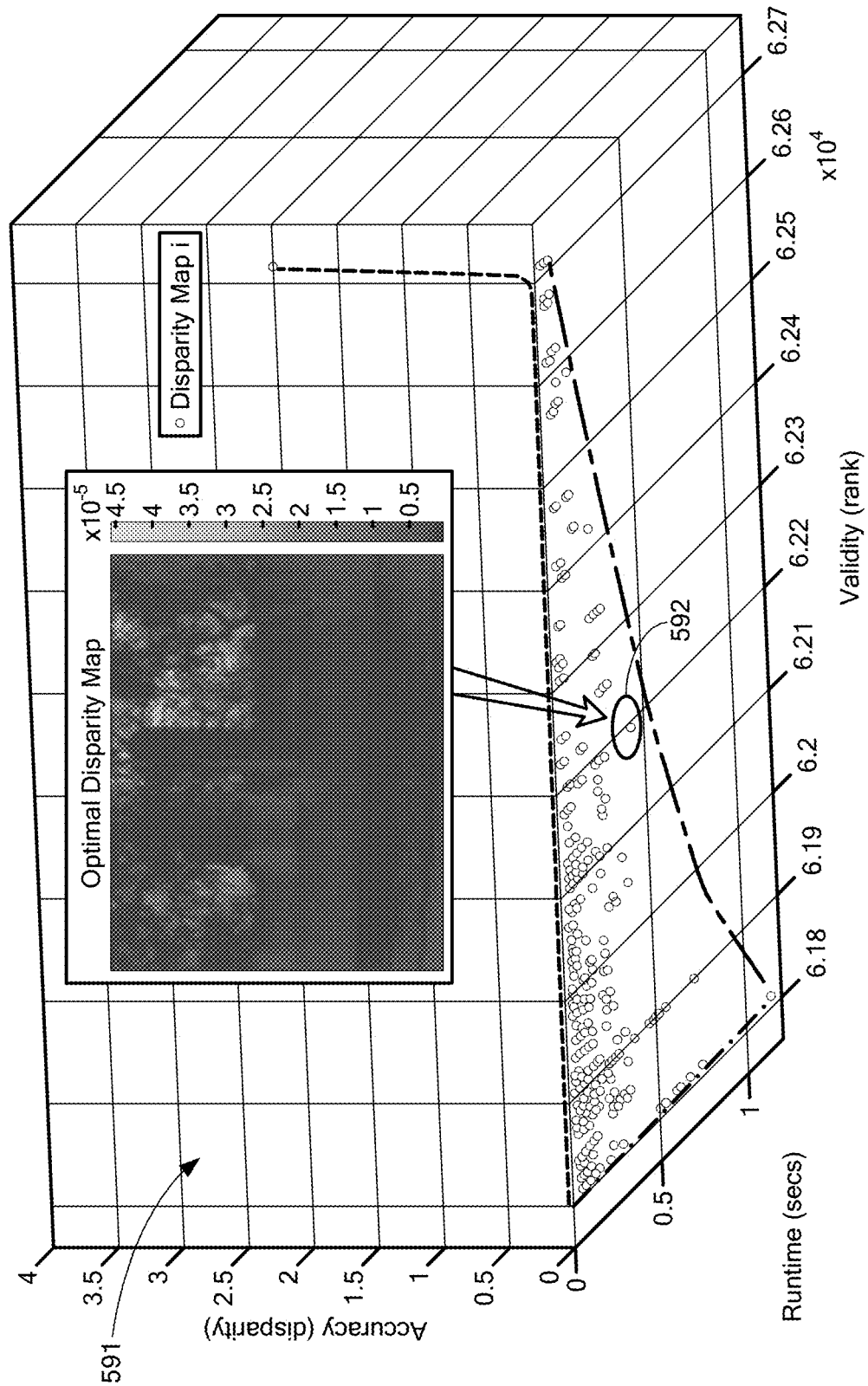
FIG. 5B schematically illustrates a 3D Pareto frontier of a plurality of disparity maps.
Figure 5C:
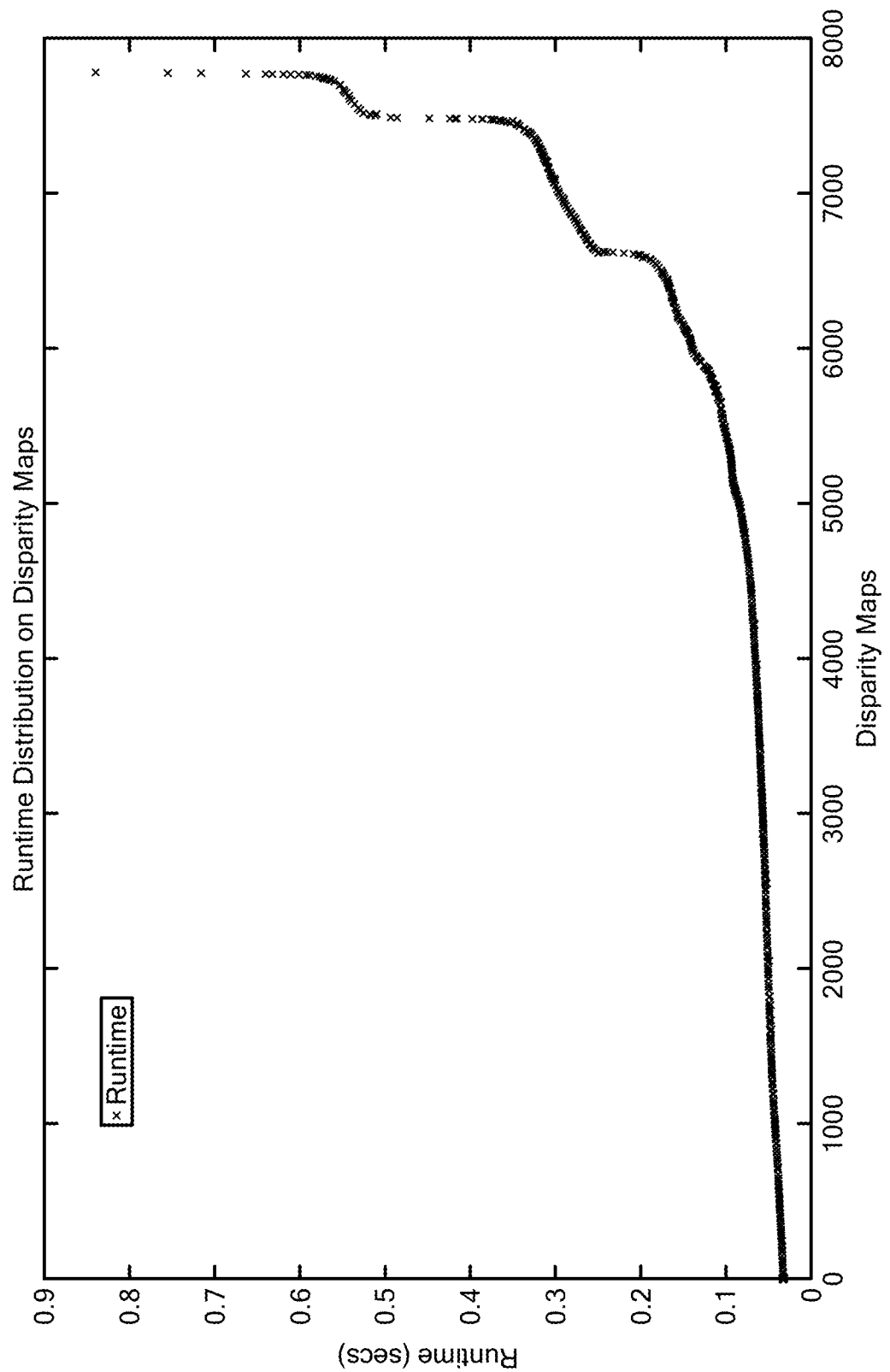
FIG. 5C schematically illustrates a plurality of disparity maps ranked by runtime.
Figure 5D:
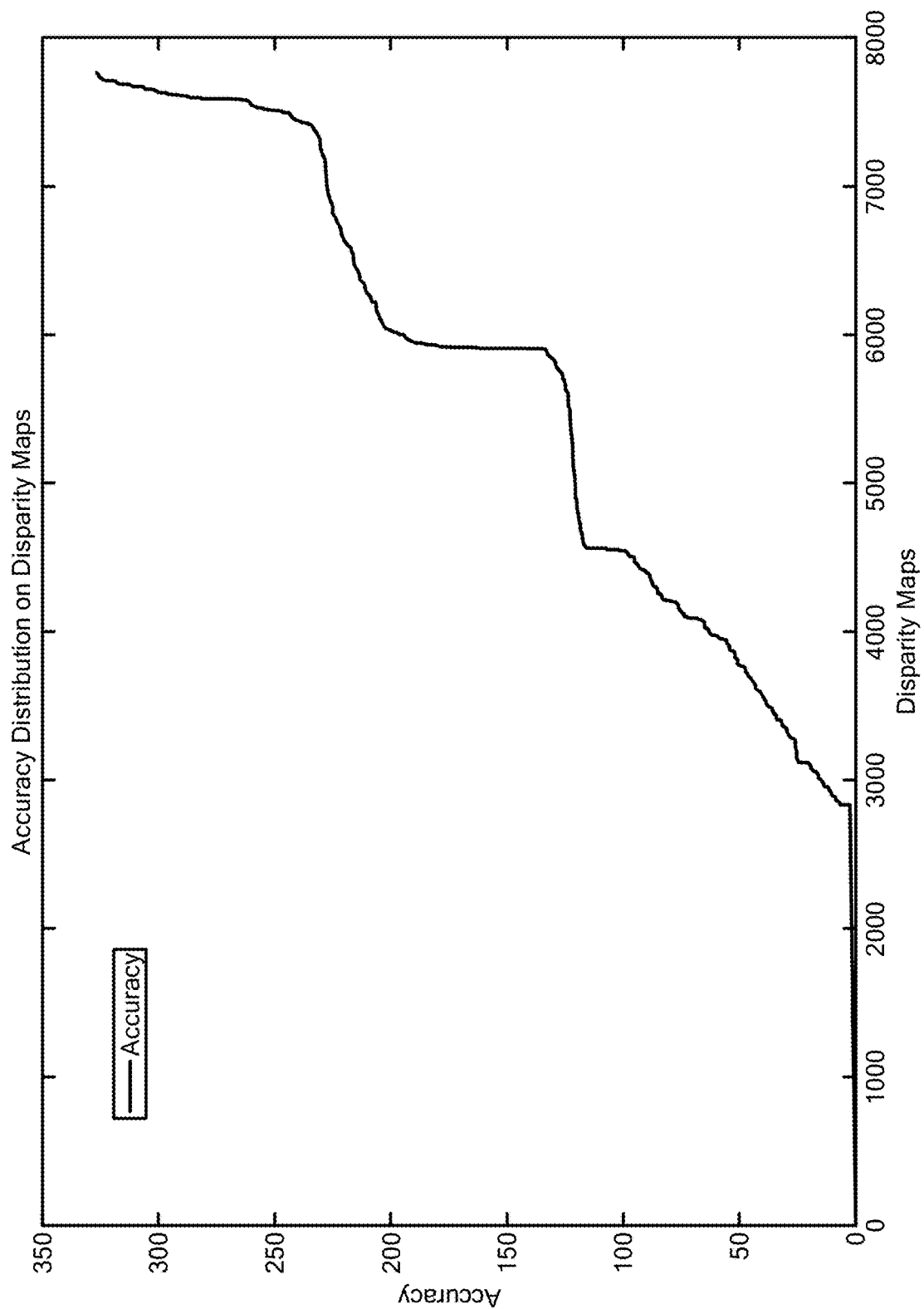
FIG. 5D schematically illustrates a plurality of disparity maps ranked by accuracy.
Figure 5E:
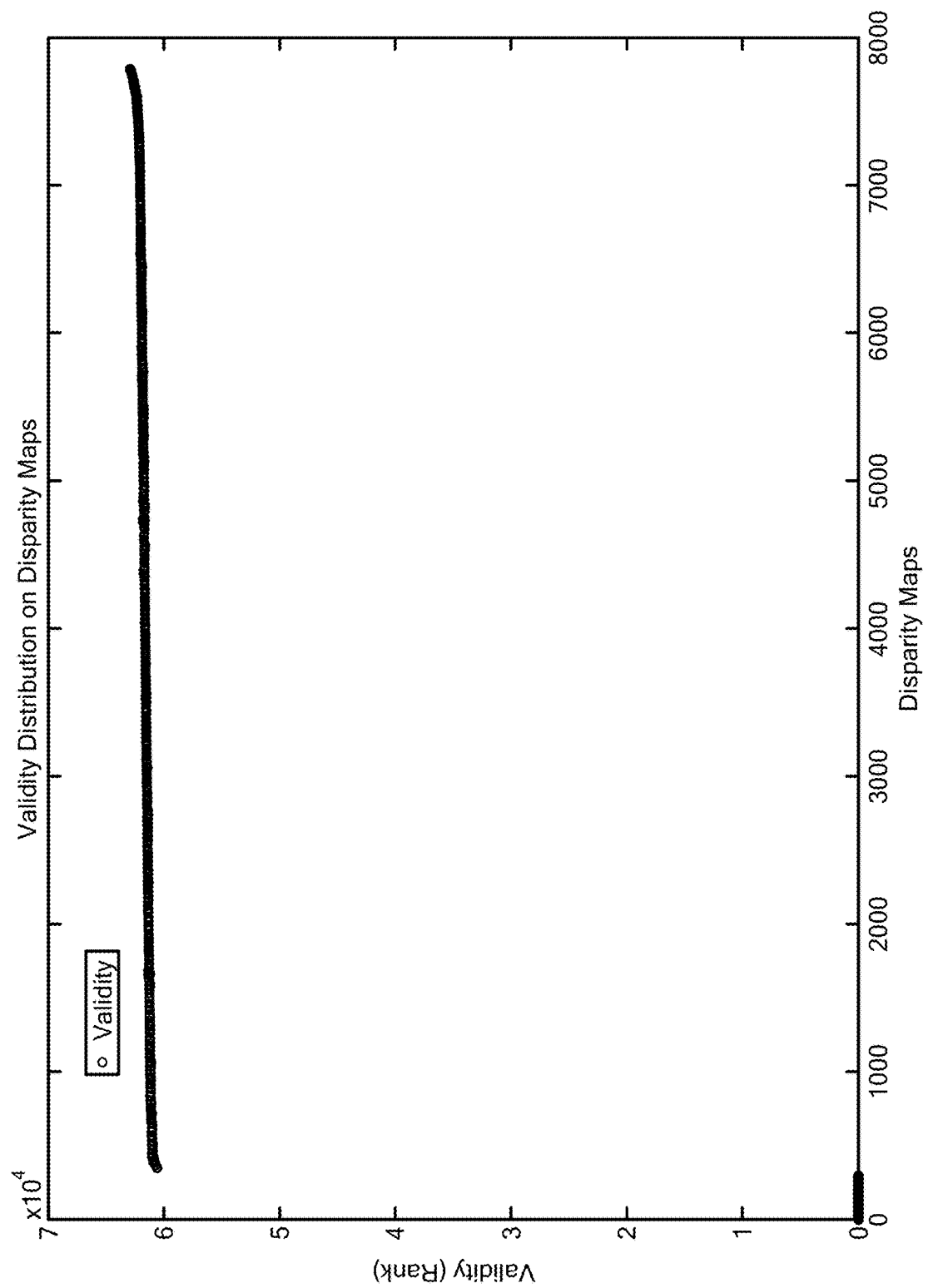
FIG. 5E schematically illustrates a plurality of disparity maps ranked by validity.

Then, at step 550, the method organizes all of (or, in preferred embodiments, a subset of) the plurality of disparity maps into a Pareto frontier 591 (FIG. 5B).

Preferred embodiments select, for inclusion in the Pareto frontier, a subset of the plurality of disparity maps, which subset includes the disparity maps that have both high accuracy and high validity. Disparity maps within that subset may be referred-to as the "optimal" disparity maps (ODMs).

To select the ODMs, the method identifies a first set of disparity maps as those disparity maps with the highest validity metrics—e.g., those disparity maps having a validity metric above a validity threshold—and identifies a second set of disparity maps as those disparity maps with the highest accuracy metrics—e.g., those disparity maps having an accuracy metric above a accuracy threshold. For example, the method may select, for the first set, those disparity maps in the top 20 percent (20%) of disparity maps by accuracy metric (in this example, the accuracy threshold is 20%), and may select, for the second set, those disparity maps in the top 20 percent (20%) of disparity maps by validity metric (in this example, the validity threshold is 20%).

The method then identifies, as the ODMS, those disparity maps that fall into both the first set and second set. Those ODMS form a third set (which may be referred to as a "Pareto" set). A disparity map that falls into the first set, but not the second set, is not identified as an ODM, and a disparity map that falls into the second set, but not the first set, is not identified as an ODM. If the third set fails to include any disparity maps, then the method raises one or both of the validity threshold and the accuracy threshold (for example, to 25%, 30%, 35%, 40%, 45%, 50%), and repeats the foregoing steps until it produces a third set having a least one disparity map.

The method then organizes the disparity maps of the third set (Pareto set) onto the Pareto frontier. A graphical example of a Pareto frontier is schematically illustrated in FIG. 5B. As illustrated, the plurality of disparity maps is organized in a 3D space, with axes indicating Accuracy, Validity and Runtime.

In some embodiments, an operator, or an automatic stereo-matching system, may select, for use in a GB-CSSM algorithm, a set of input parameters corresponding to any one of the disparity maps on the Pareto frontier, depending on the needs of the system being implemented. For example, if a system requires a runtime that does not exceed 0.5 seconds, an operator, or an automatic stereo-matching system, may select, for use in a GB-CSSM algorithm, the input parameters that produced the disparity map 592 that is circled in FIG. 5B. As shown on the Pareto frontier of FIG. 5B, those input parameters, when specified in the GB-CS SM, yield a disparity map having a better validity than others that run in 0.5 seconds or less. Similarly, if the stereo matching system (in which the disparity map is to be generated) requires a shorter (or can afford a longer) run time, the Pareto frontier indicates that there are several options available at shorter (or longer) runtimes, which options have even greater validity and approximately equal accuracy.

IV. A 2D Pareto Frontier; the Quality Metric Equation and the Quality Metric ("Y")

An alternate method of assessing quality maps includes generating a 2D Pareto frontier using a Quality Metric Equation ("QME"). In short, the QME combines the accuracy metric and the validity metric into a single metric called the "Quality Metric" (denoted as "Y"), and the 2D Pareto frontier organizes disparity maps (each having a known IP Vector) by the Quality Metric and runtime. An illustrative embodiment of a 2D Pareto frontier 600 is schematically illustrated in FIG. 6A.

In preferred embodiments, the disparity maps selected for inclusion in the 2D Pareto frontier are the disparity maps with the highest Quality Metric ("Y") (for example, the top 20%, the top 25%, the top 30%, etc.), and disparity maps with a lower quality value at each time step are omitted. In this way, the population of disparity maps on the Pareto frontier 600 form a subset of the plurality of disparity maps (a Pareto set). Such embodiments beneficially reduce the number of disparity maps used for subsequent processing (e.g., disparity map classification, since disparity maps on the 2D Pareto frontier are the inputs to the disparity map classification algorithm described below).

Figures 6A, 6B, 6C:
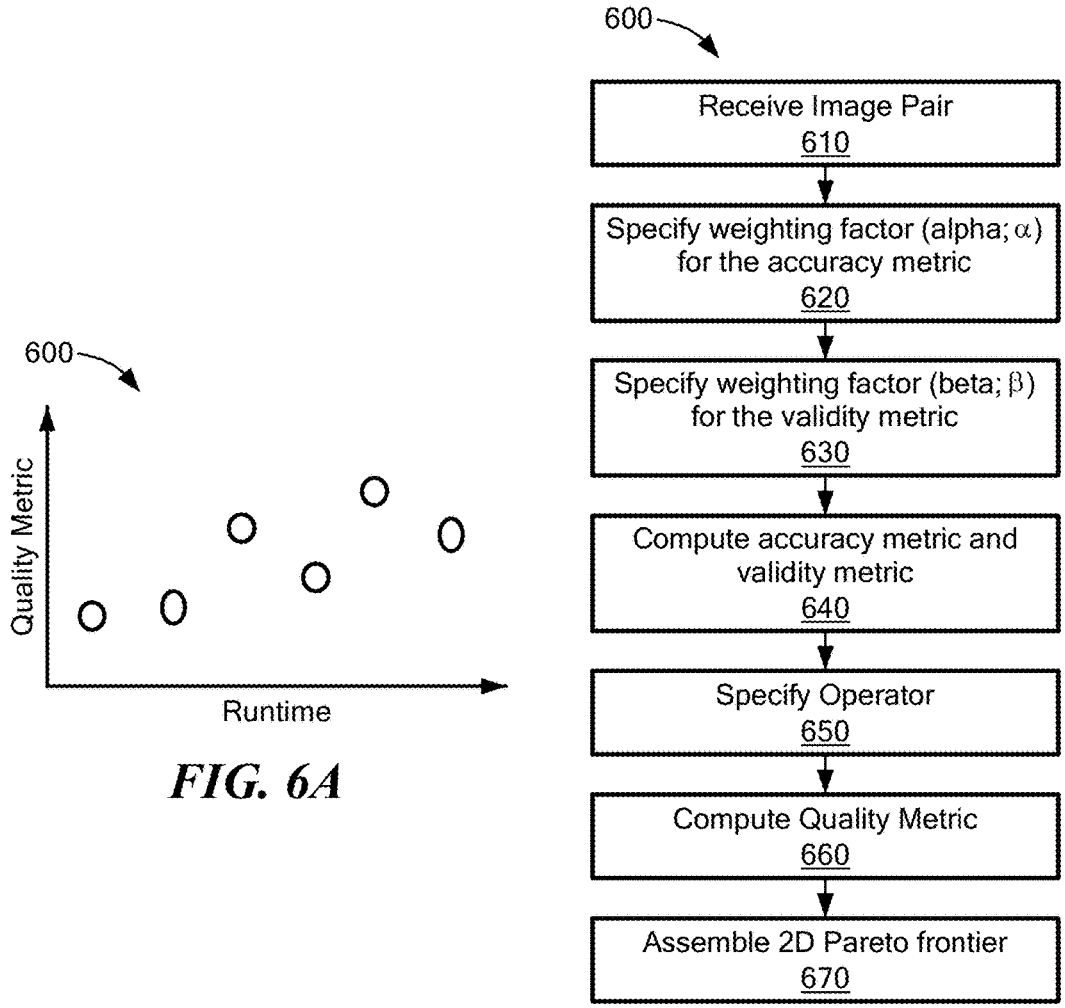
FIG. 6A schematically illustrates a 2D Pareto frontier of a plurality of disparity maps.
FIG. 6B is a flowchart of a method of creating a 2D Pareto frontier from a plurality of disparity maps using a Quality Metric Equation.
FIG. 6C presents pseudocode for preparing a 2D Pareto frontier from a plurality of disparity maps using a Quality Metric Equation.

FIG. 6B contains a flowchart that schematically illustrates steps of a method 600 for creating a 2D Pareto frontier from a plurality of disparity maps using a Quality Metric Equation. At step 610, an image pair is received. Prior to constructing a Pareto frontier of the disparity maps, some embodiments specify a weighting factor (alpha; α) for the accuracy metric (step 620), and some embodiments specify a weighting factor (beta; β) for the validity metric (step 630). In some embodiments, the weighting factor α=1 and the weighting factor β=1, but in other embodiments those weighting factors may have different values. The weighting factors α and β permit accuracy and validity to have varying importance relative to each other in subsequent processing.

Then, at step 640, the method determines (computes) an accuracy metric ("A") and a validity metric ("B") using the following formulas:

A=α×Accuracy (Disparity map i); and

B=β×Validity (Disparity map i)

Next, at step 650, the method specifies (or receives a specification of) an Operator. The Operator is one of the following: "+" (addition); "−" (subtraction); "x" (multiplication) and "/" (division; sometimes also represented by "÷").

Then, at step 660, the method determines (computes) a quality metric ("Y") using the following formula:

Y=A Operator B.

Then, at step 670, the method assembles a 2D Pareto frontier that organizes the disparity maps by Quality Metric and runtime. Pseudocode for assembling a 2D Pareto frontier is presented in FIG. 6C.

V. Rules and Signatures

The quality of a disparity map for a scene created from a cross-spectral image pair of the scene may depend on environmental conditions for the scene. Such environmental conditions may include, for example, the type of terrain in the scene (e.g., desert; forest; mountain; tropical jungle; tundra, to name but a few examples), the time of day at which one or both of the images of the cross-spectral image pair were captured (e.g., night; dawn; noon; mid-afternoon; dusk; evening, to name but a few examples); the ambient light at the time during which one or both of the images of the cross-spectral image pair were procured (e.g., dark; bright; overcast, to name but a few examples); the season during which one or both of the images of the cross-spectral image pair were captured (e.g., winter; spring; summer; autumn), or the weather conditions during which one or both of the images of the cross-spectral image pair were captured (e.g., no precipitation; raining; snowing, to name but a few examples), or any combination of the foregoing factors. Environmental conditions may influence the selection of an IP vector for purposes of creating a disparity map for the scene.

Preferred embodiments prepare subsets of rules, each subset including a set of rules corresponding to a set of environmental factors. The signatures may be used to classify a disparity map, and associate the disparity map's classification with the IP vector that created the disparity map. In this way, illustrative embodiments build, for each rule, a corresponding family 715 (FIG. 7A) of IP vectors, from which may be selected, for a specified set of environmental factors, an IP vector for use in generating one or more disparity maps. This is possible even if no IP vector is known, a priori, to correspond to the signature.

An illustrative embodiment of subsets for a range of scenes is schematically illustrated in FIG. 7A, and an illustrative embodiment of subsets for a range of image qualities for a single scene is schematically illustrated in FIG. 7B.

1. Subsets for the Different Scenes

The subsets of FIG. 7A are illustrated in a table, in which each row represents a rule associated with a set of environmental conditions for image pairs of different scenes. For example, "Conditions A" in several of the rows denotes a set of environmental conditions common to those rows, and those rows define a subset. As an example, Conditions A may denote environmental conditions specifying mountainous terrain, in winter, at night, in the dark with no precipitation.

A second subset includes rows that share environmental conditions "Conditions B." Conditions B denote environmental conditions that differ from Conditions A. As an example, Conditions B may denote environmental conditions that include summer rather that the winter condition of Conditions A (for example, Conditions B may specify mountainous terrain, in summer, at night, in the dark with no precipitation).

Row 710 of the table in FIG. 7A defines a rule for disparity maps associated with environmental Conditions A, and that are known to be in the "Recognizable" category, with type "Good." The rule includes a signature 712. In illustrative embodiments, the signature 712 is a fingerprint histogram of a disparity map associated with environmental Conditions A, and known to be in the "Recognizable" category, with type "Good." In preferred embodiments, the signature is a composite histogram in which each partition is an average of corresponding partitions in a plurality of other histograms. The rule 710 also includes a family 715 of IP vectors, which family includes the IP vectors of the disparity maps associated with environmental Conditions A, and that are known to be in the "Recognizable" category, with type "Good." In other words, the IP vectors in the family 715 of IP vectors are known to produce, from a cross-spectral image pair, a disparity map that will be in the "Recognizable" category, with type "Good."

2. Subsets for the Same Scene

The subsets of FIG. 7B are illustrated in a table, in which each row represents a rule associated with a set of environmental conditions for images pairs of the same scene, in which the images of each image pair are of different qualities. For example, "Conditions C" in several of the rows denotes a set of environmental conditions common to those rows.

As an example, Conditions C may denote environmental conditions specifying tropical (e.g., jungle) terrain, in winter, at night, in the dark with no precipitation.

Disparity maps created from a pair of images, in which at least one image of the pair of images is of a scene, and is captured under the environmental conditions of Conditions C (and the other image of the pair of images is of the same scene, and which may be captured at an earlier time and/or under other environmental conditions) may be classified into one of several different classifications and types, as described below.

Similarly, Conditions D denote environmental conditions that differ from Conditions C. As an example, Conditions D may denote environmental conditions that include summer rather that the winter condition of Conditions C (i.e., Conditions D specifies tropical terrain (since the image pairs are of the same scene), in summer, at night, in the dark with no precipitation).

Although the foregoing examples include only two varieties of environmental conditions (Conditions A and Conditions B in FIG. 7A, and Conditions C and Conditions D in FIG. 7B), preferred embodiments include more than two such sets of environmental conditions, and preferably include a line for each possible combination of environmental conditions.

VI. Disparity Map Classification ("DMC")

Embodiments of disparity map classification methods are described below.

A. Disparity Map Classification Over a Range of Scenes ("AADS")

Figure 8A:
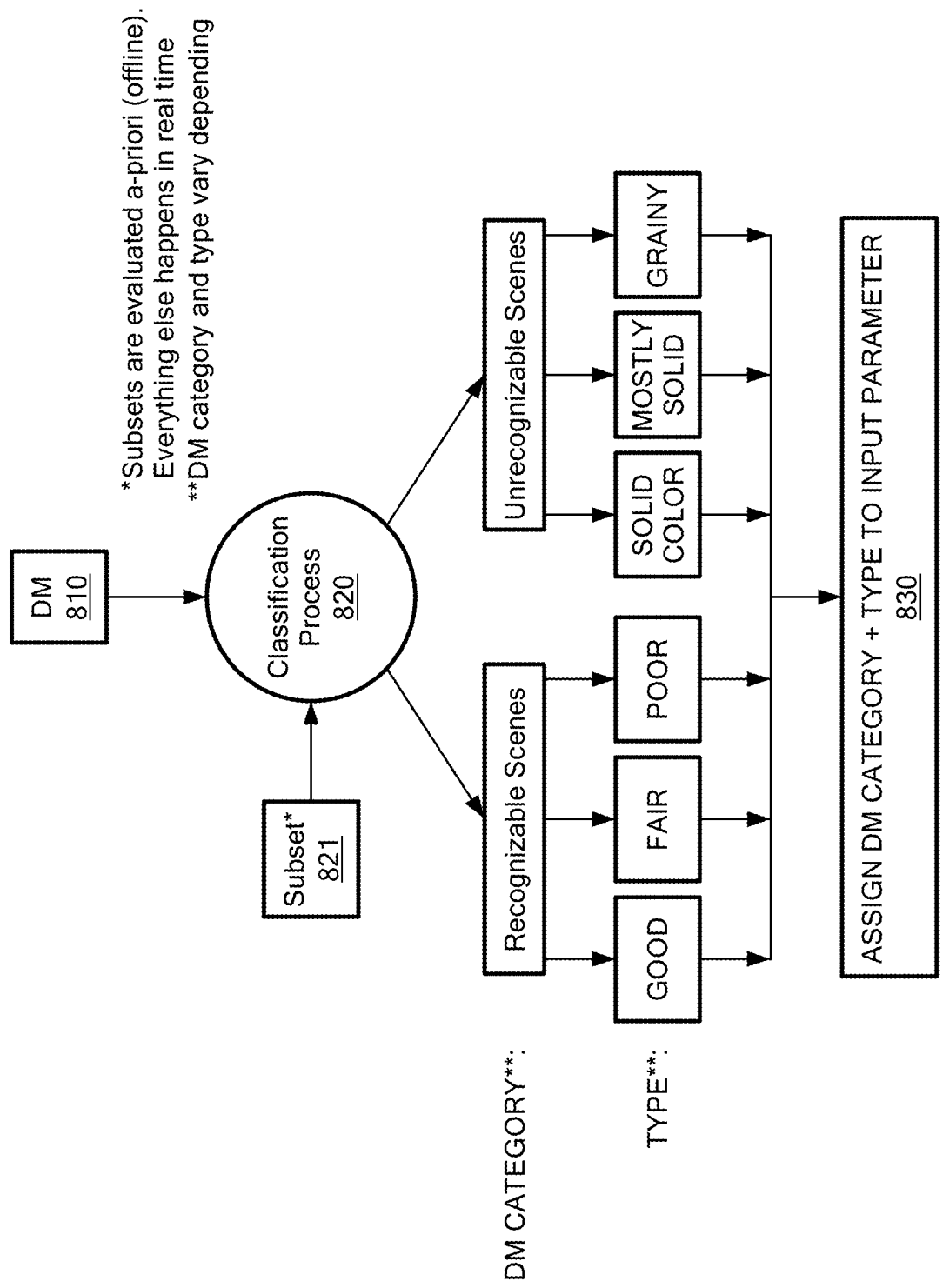
FIG. 8A is a flowchart of a method for categorizing disparity maps over a range of scenes.

One method includes an analysis across a range of scenes, as schematically illustrated by FIG. 8A. Pseudocode for implementing such an analysis is presented in FIG. 8B.

These illustrative embodiments classify disparity maps (each with its associated set of input parameters) into two DM Categories (Recognizable and Unrecognizable), and into one of six Types (the scenes in the Recognizable DM Category includes Types Good, Fair and Poor; and the scenes in the Unrecognizable DM Category include Types Solid Color, Mostly Solid Color, and Grainy).

This analysis gathers a group of cross-spectral input image pairs, each representing different scenes, and uses the process described above to generate a set of disparity maps for each scene. Next, the method (1) constructs Pareto frontiers in order to identify a pool of potential best disparity maps among all the scenes under consideration, and (2) applies the DMC algorithm to categorize the scenes and identify their corresponding IP vectors.

In FIG. 8A, the DMC algorithm classifies every disparity map based on the rules defined within a subset. These rules dictate the classification structure of the algorithm. When classifying gradient-based disparity maps depicting a range of scenes, recognizable scenes can exhibit good, fair, or poor quality, while unrecognizable scenes can be found to be solid color, mostly solid color, or grainy. The classification process ends by assigning a category and type to every disparity map and corresponding input-parameter combination.

At step 810, the method creates a disparity map from an input image pair using an IP vector. In some embodiments, the IP vector may be pre-selected (for example, it may be an IP vector known to produce good disparity maps), and in other embodiments, the IP vector is a random set of the seven input parameters. In any case, the IP vector is recorded in association with the disparity map it produces.

At step 820, the method classifies the disparity map by matching the disparity map to a one of the signatures in the subset.

As described above, each signature of the subset of signatures 821 is associated with a classification (recognizable or unrecognizable), and a type (good; fair; poor; solid; mostly solid; grainy). The category and type of the signature that matches the disparity map is assigned to the IP vector associated with the disparity map, at step 830.

In some embodiments, step 830 also includes updating said signature (or set of signatures) by adding to said signature (or set of signatures) the IP vector according to the class (or both class and type) assigned to the corresponding IP vector.

In some embodiments, wherein each signature from the set of signatures also has an associated set of environmental conditions, step 830 also includes assigning, to the IP vector, the associated set of environmental conditions.

There are several embodiments for methods of matching the disparity map to a one of the signatures in the subset of signatures 821. Each embodiment includes creating a fingerprint histogram of the disparity map. Each signature has an associated histogram.

1. Disparity Density

In one embodiment, the step of matching the disparity map to a one of the signatures in the subset of signatures 821 is performed by assessing the number of disparities in a set of the partitions that include the smallest disparities. This metric may be referred to as the disparity density. For example, some embodiments classify a disparity map as "unrecognizable" and having a type "solid" if all (or a specified percentage—"THRESHOLDmsc") of the disparities in the disparity map fall within the three segments that include the shortest disparities. As an illustrative example, a disparity map may be classified as unrecognizable/solid if 90 percent of its disparities fall within the bottom three partitions of the disparity map's fingerprint histogram.

For example, in the pseudocode of FIG. 8B, if all of the disparities fall into sub-range zero, then the disparity map is categorized as "Unrecognizable" and "Solid Color."

Also as illustrated in the pseudocode of FIG. 8B, if the sum of the percentages of disparities that fall within sub-ranges 0 and 3 exceeds a threshold (in this example, 99 percent), then the disparity map is categorized as "Unrecognizable" and "Mostly Solid Color."

2. Histogram Matching

In another embodiment, the step of matching the disparity map to a one of the signatures in the subset of signatures 821 is performed by comparing the disparity map's fingerprint histogram to the signature histogram of one or more signatures until a match is found. The matching process may be the method described in connection with FIG. 4D, above. For example, the signature may be the reference histogram (or a set of more than one reference histogram), and the fingerprint may be the second histogram.

In illustrative embodiments, the signature histogram may be a single histogram, or an average of a plurality of histograms. A signature histogram that is an average of a plurality of histograms is a histogram having a plurality of partitions, and the value of each partition within the plurality of partitions is the average of the values of the corresponding partition in each of the plurality of histograms.

In some embodiments, the signature histogram may include a set of histograms, and a fingerprint histogram is deemed to match the signature histogram when the value of each partition (bar) of the fingerprint histogram matches the value of the corresponding partition (bar) of any one of the set of the histograms within said set of histograms.

For example, in the pseudocode of FIG. 8B, "GRAINY DM" is a rule that has a signature corresponding to an "Unrecognizable" and "Grainy" class and type. When the fingerprint for a disparity map matches the signature of the "GRAINY DM" rule, then that disparity map (and its associated IP vector) are classified as "Unrecognizable" with a type of "Grainy."

The pseudocode of FIG. 8B also includes several other rules with associated signatures—i.e., "Subset of Poor Recognizable Scenes" and "Subset of Fair Recognizable Scenes." Continuing with that example, when the fingerprint for a disparity map matches the signature of the "Subset of Poor Recognizable Scenes" rule then that disparity map (and its associated IP vector) are classified as "Recognizable" with a type of "Poor."

3. Entropy

Figure 8C:
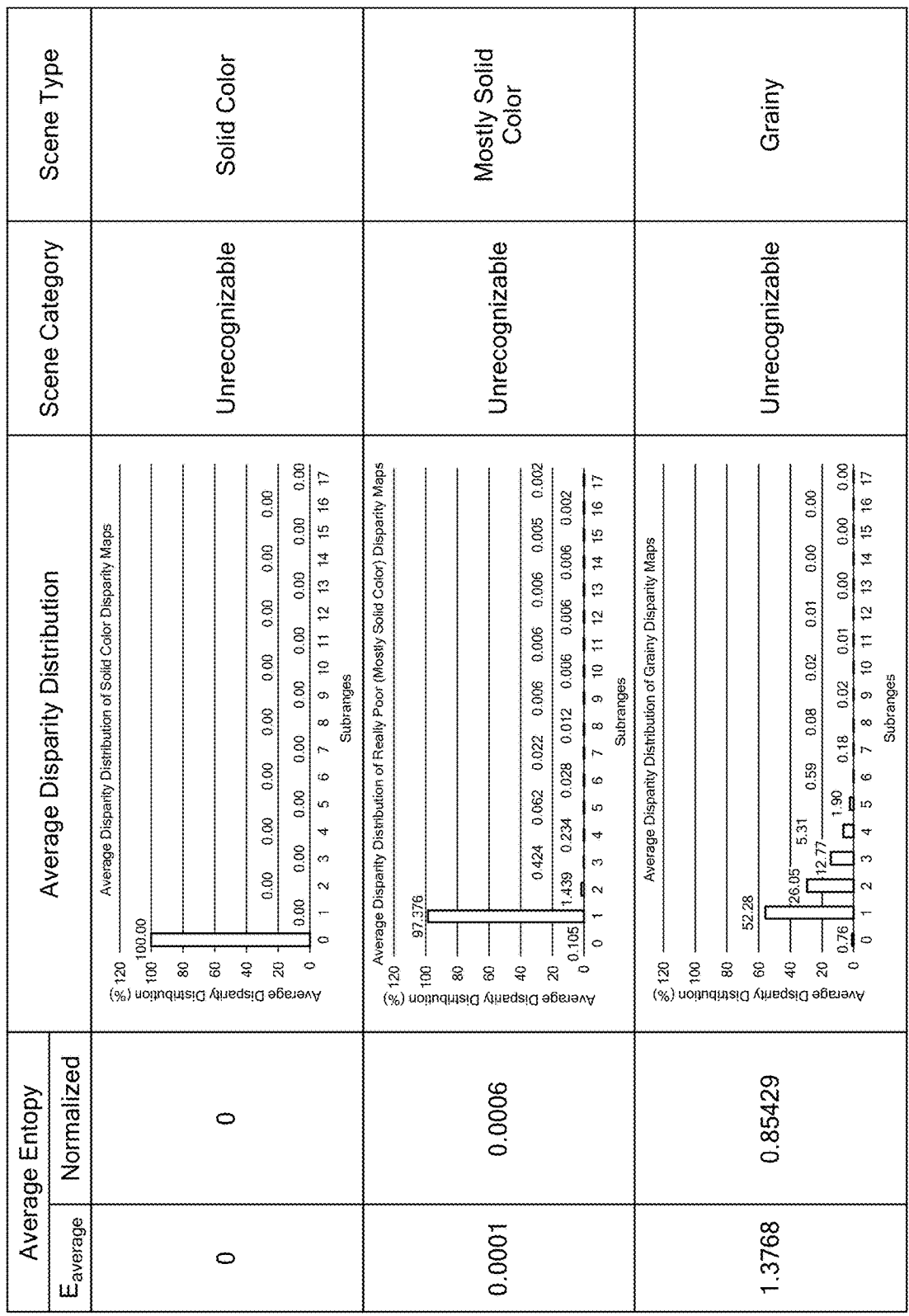
FIG. 8C is a table of entropies of histograms correlated to disparity map category and type.
Figure 8C:
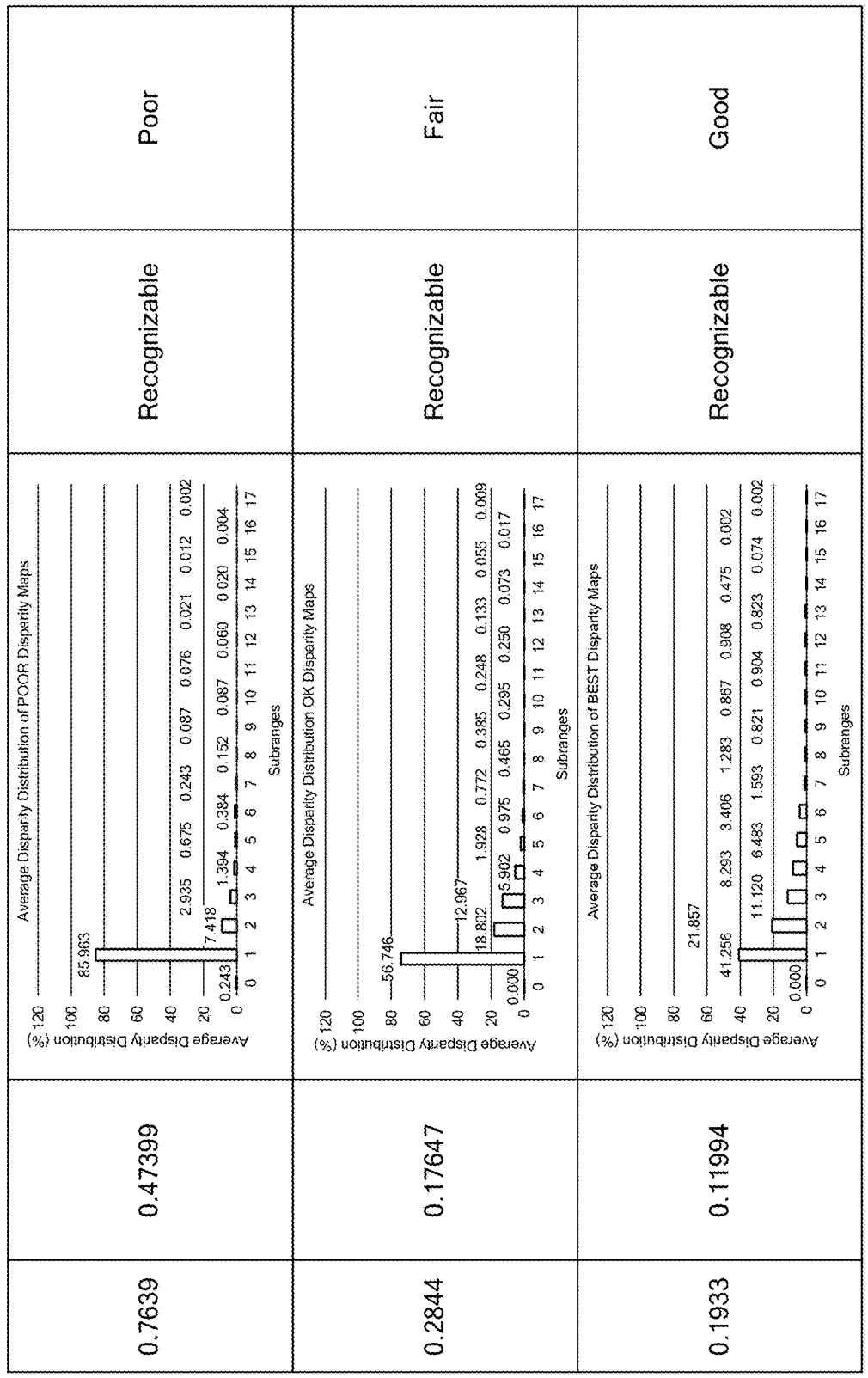

Some embodiments classify a disparity map according to the entropy of its fingerprint histogram. Finding the entropy of a histogram is a well-known process. Each class and type is associated with an entropy or a range of entropies, and a histogram may be assigned a category and type based on the value of that entropy. For example, FIG. 8C includes a table of fingerprint histograms, each with an associated entropy, class and type.

According to the foregoing method, each of a plurality of disparity maps will be classified into one of the DM categories, and into a one of the types.

B. Disparity Map Classification of the Same Scene Over a Range of Quality ("AVIQ")

Figure 9A:
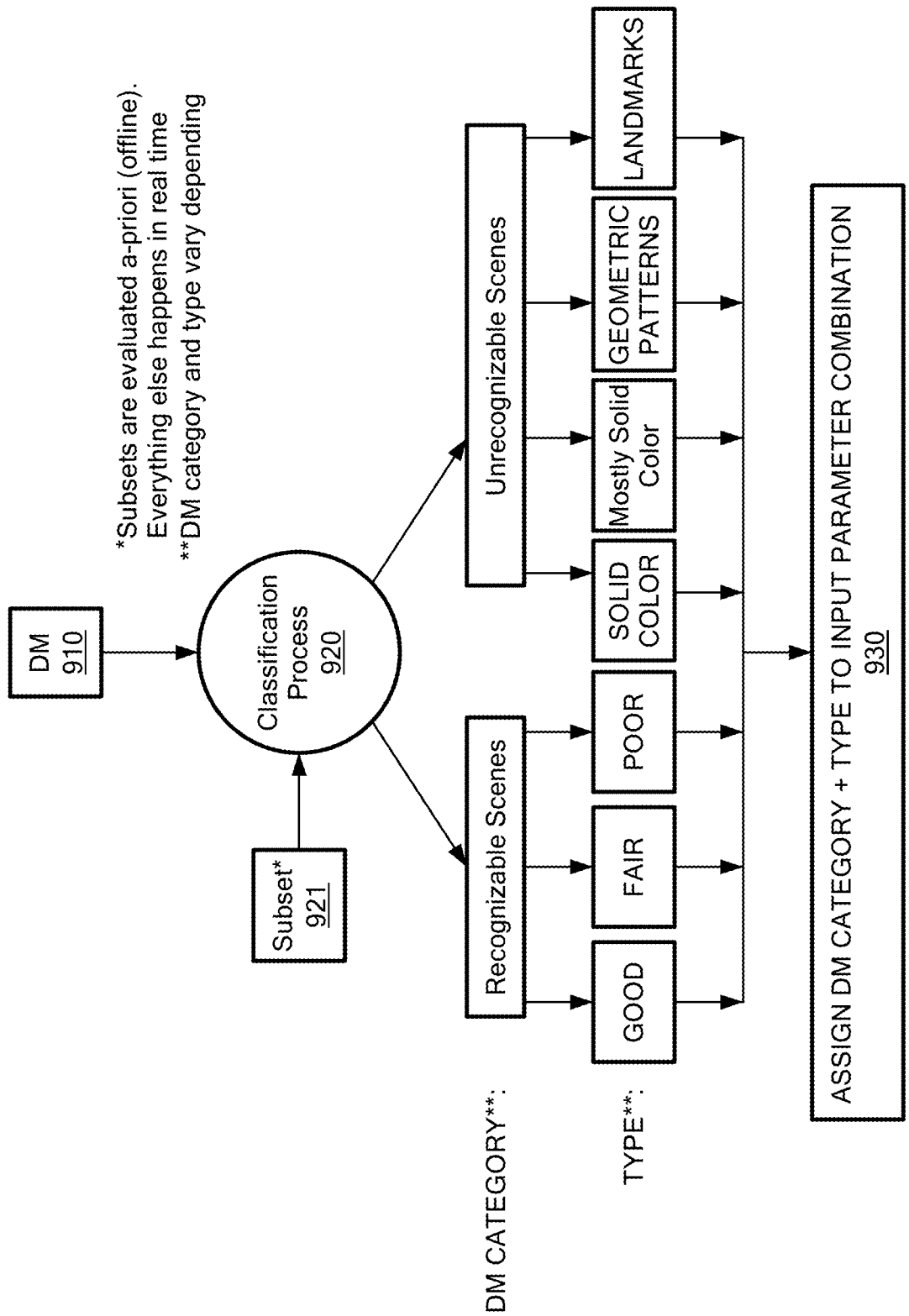
FIG. 9A is a flowchart of a method for categorizing disparity maps of a scene over a varying image quality.

Another method includes an analysis of an image pair over variable image quality, schematically illustrated by FIG. 9A. This process uses different image qualities of the same scene to assess the operation of the GB-CS SM algorithm when cross-spectral input images of degraded quality are provided as inputs. Pseudocode for implementing such an analysis is presented in FIG. 9B.

These illustrative embodiments classify disparity maps (each with its associated set of input parameters) into two DM Categories (Recognizable and Unrecognizable), and into one of seven Types (the scenes in the Recognizable DM Category includes Types Good, Fair and Poor; and the scenes in the Unrecognizable DM Category include Types of Solid Color, Mostly Solid Color, Geometric Patterns, and Landmarks).

Steps 910-930 of the method of FIG. 9A and FIG. 9B match the fingerprint histogram of a disparity map to a signature histogram as described above in connection steps 810-830 of FIG. 8A and FIG. 8B, except the method of FIG. 9A and FIG. 9B uses the signatures (921) of FIG. 7B, and assigns the IP vector of each disparity map into one of seven types.

VII. Selecting an IP Vector

Operation of a stereo matching system presents a question of how to select an IP vector (i.e., a combination of input parameters) to produce a disparity map that is of useable (or possibly even optimal) quality, for the intended application of the stereo matching system in which the GB-CSSM algorithm is used.

Figure 10A:
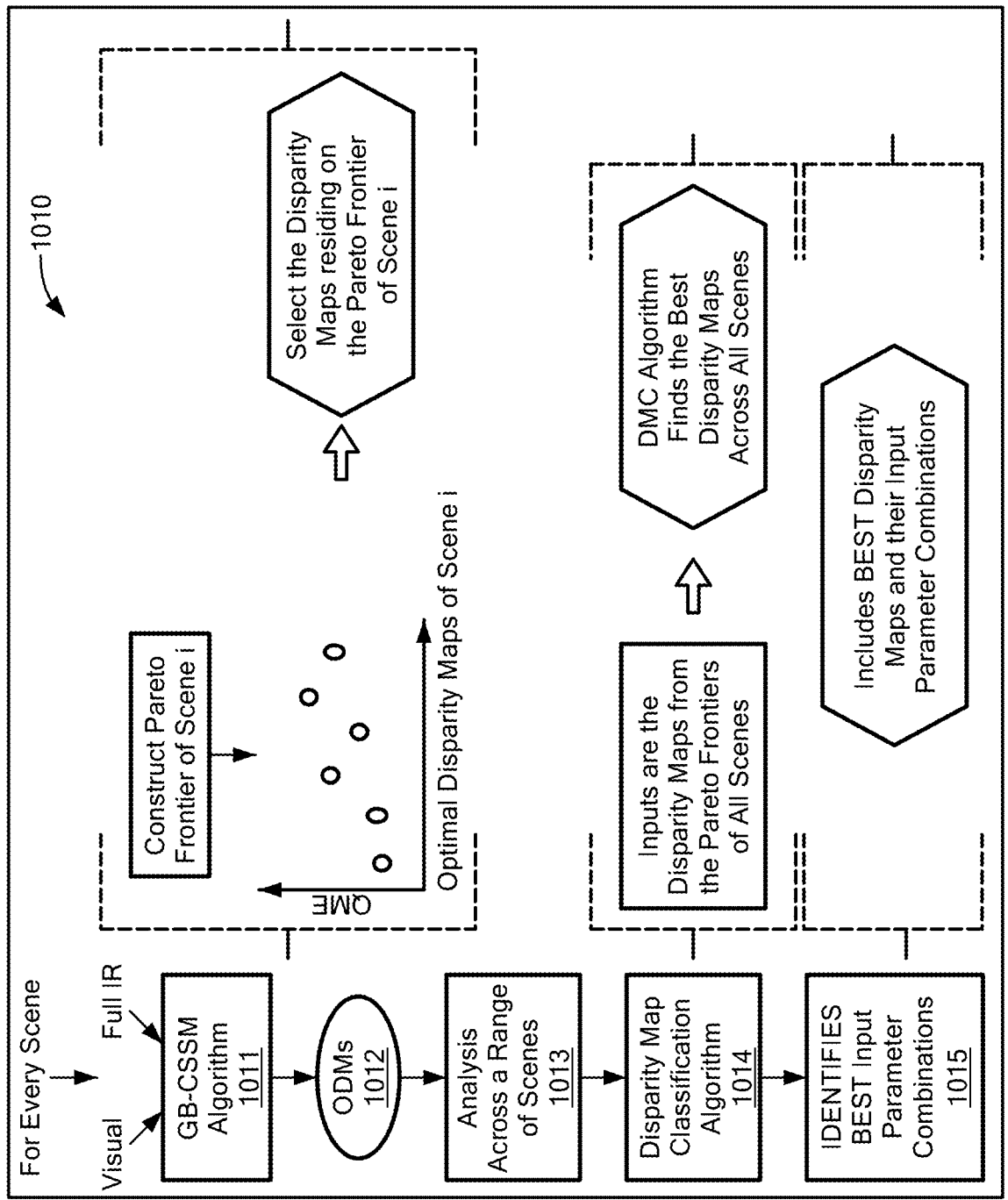
FIG. 10A is a flowchart for an embodiment of a method of determining an IP vector.
Figure 10B:
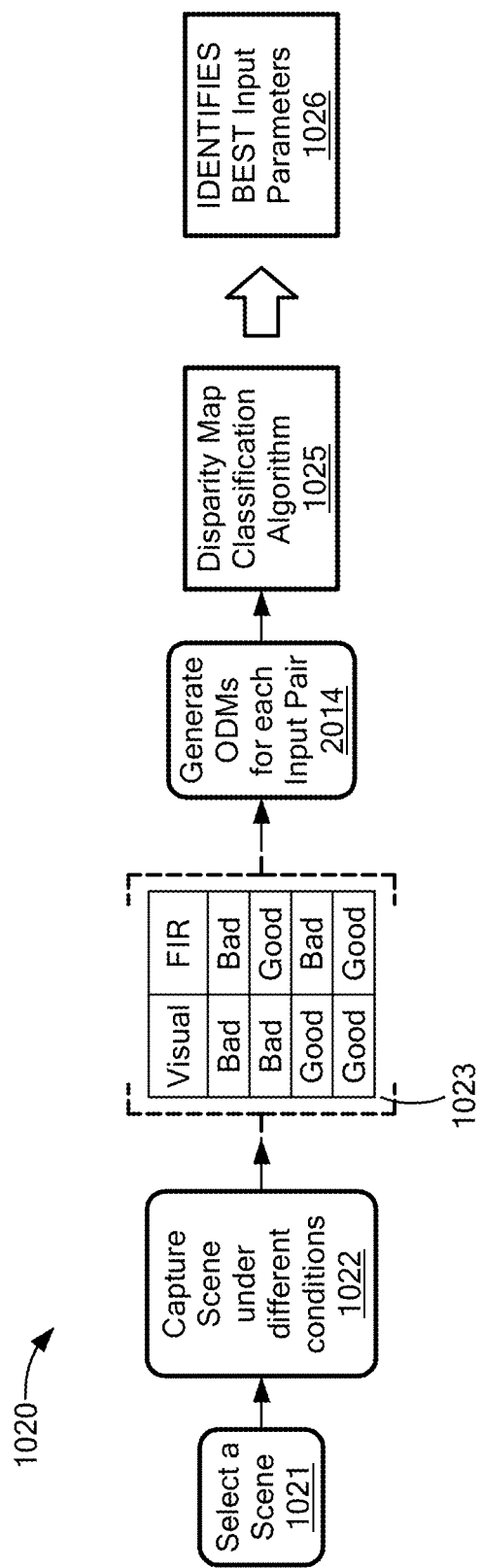
FIG. 10B is a flowchart for an alternate embodiment of a method of determining an IP vector.
Figures 10C, 10D:
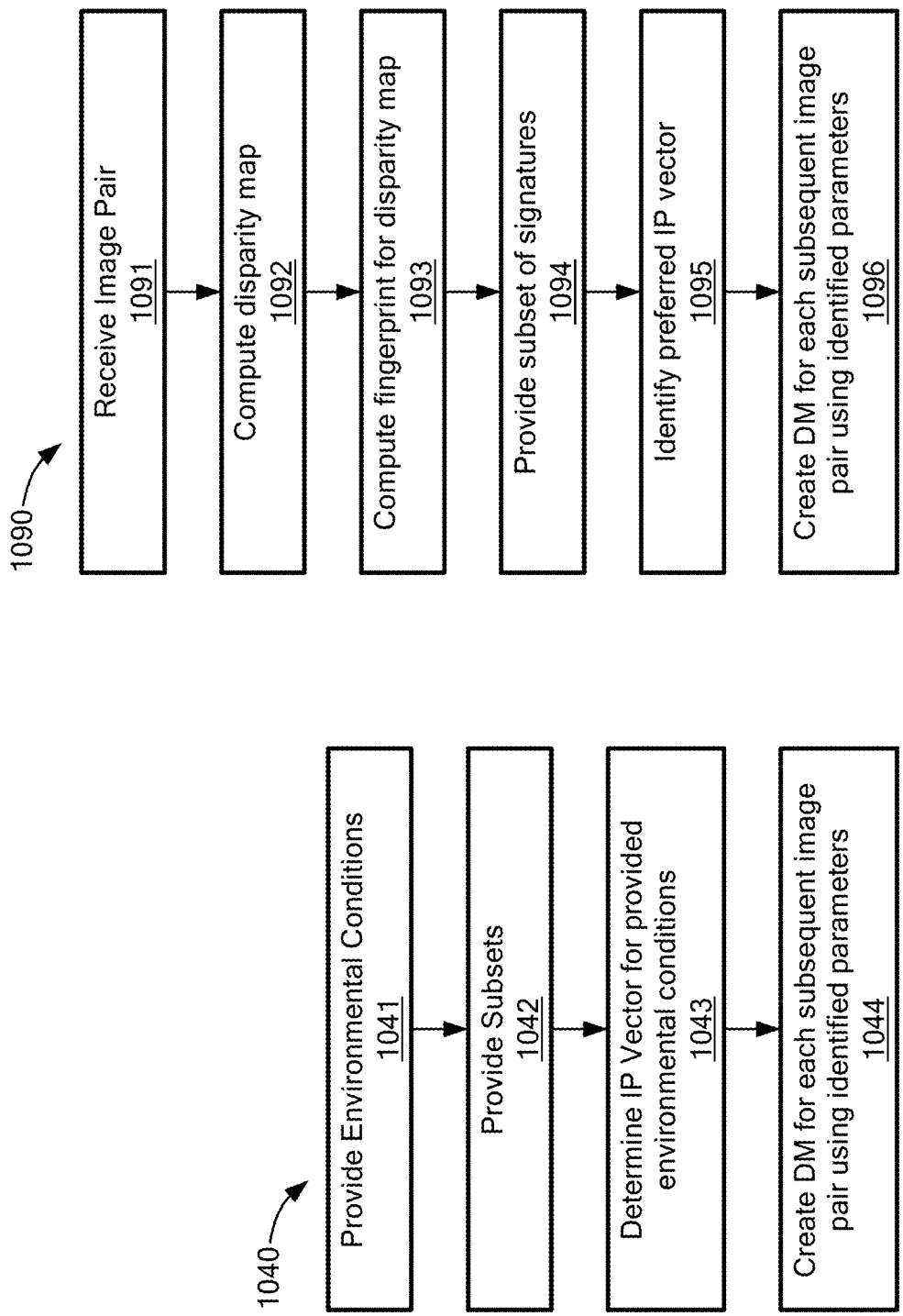
FIG. 10C is a flowchart for an alternate embodiment of a method of determining an IP vector.
FIG. 10D is a flowchart for an alternate embodiment of a method of determining an IP vector.

FIG. 10A and FIG. 10B and FIG. 10C illustrate embodiments of methods of selecting an IP vector.

A. Selecting an IP Vector Using Signatures from a Range of Scenes

FIG. 10A illustrates an embodiment of a method 1010 of selecting an IP vector using a signature from a range of scenes (e.g., as described in connection with FIG. 7A).

At step 1011, the method computes a plurality of disparity maps for an input image pair, where the input image pair is of a different scene than images found in the subsets (in other words, the two images of the input image pair are of the same scene, but different from the scene from a range of scenes found in the subsets). Each disparity map of the plurality of disparity maps is created using a corresponding, unique IP vector, so that no two of the disparity maps are identical.

At step 1012, the method creates, for the input image pair, a Pareto frontier. The disparity maps on the Pareto frontier form a subset of the plurality of disparity maps, and may collectively be referred to as the "optimal disparity maps" ("ODMs").

Steps 1011 and 1012 are then repeated over a plurality of scenes (a range of scenes) (step 1013) to produce a plurality of Pareto frontiers.

At step 1014, the disparity maps of each of the Pareto frontiers is classified via the disparity map classification algorithm described above, to produce families of IP vectors, as described above in connection with FIG. 7A. Each IP vector of the families of IP vectors may be referred to as a "candidate" IP vector.

Then, at step 1015, the method selects the best candidate IP vector as the IP vector associated with the best of the classified disparity maps. Disparity maps (and their associated IP vectors) may thus be ranked from highest to lowest. The best of the classified disparity maps is the disparity map having the highest classification and type, according to the following list, which presents the classes and types from highest to lowest:

| Rank | Class | Type |
|---|---|---|
| 1. | Recognizable | Good |
| 2. | Recognizable | Fair |
| 3. | Recognizable | Poor |

-continued

| Rank | Class | Type |
|---|---|---|
| 4. | Unrecognizable | Grainy |
| 5. | Unrecognizable | Mostly Solid |
| 6. | Unrecognizable | Solid |

For example, if the subsets of signatures includes a disparity map that is recognizable and good, and also includes a disparity map that is recognizable and fair, the method will select, as the selected IP vector, the IP vector associated with the disparity map that is recognizable and good, since that disparity map is ranked higher than the disparity map that is recognizable and fair.

When more than one IP vector is available within a family, some embodiments select, as the selected IP vector, the IP vector associated with the most recently added disparity map. For example, a most recently added disparity map will most likely have been assessed with the benefit of all prior disparity maps (and associated IP vectors), and its associated IP vector may therefore be considered to be the most accurate of the available IP vectors within a given classification and type. Other embodiments select, as the selected IP vector, that IP vector with the shortest runtime.

B. Selecting an IP Vector Using Signatures from Varying Image Qualities

FIG. 10B illustrates an embodiment of a method 1020 of selecting an IP vector using a signature from a range of image qualities from the same scene (e.g., as described in connection with FIG. 7B).

At step 1021, the method selects a scene. For example, in a search and rescue system, the scene may be a specified search area having a known terrain.

At step 1022, the method captures visual images of the scene at a variety of image qualities (e.g., good quality and bad quality), and captures infrared images of the scene at a variety of image qualities (e.g., good quality and bad quality).

At step 1023, the method creates from those captured images a plurality of cross-spectral image pairs.

At step 1024, the method generates optimal disparity maps for each of the plurality of cross-spectral image pairs (e.g., the method generates, for each of the plurality of cross-spectral image pairs, a Pareto frontier, in which the disparity maps on the Pareto frontier are the optimal disparity maps).

At step 1025, each of the disparity maps on the Pareto frontier is classified via the disparity map classification algorithm described above, to produce families of IP vectors, as described above in connection with FIG. 7B. Each IP vector of the families of IP vectors may be referred to as a "candidate" IP vector.

Then, at step 1026, the method selects the best candidate IP vector as the IP vector associated with the best of the classified disparity maps. Disparity maps (and their associated IP vectors) may thus be ranked from highest to lowest. The best of the classified disparity maps is the disparity map having the highest classification and type, according to the following list, which presents the classes and types from highest to lowest:

| Rank | Class | Type |
|---|---|---|
| 1. | Recognizable | Good |
| 2. | Recognizable | Fair |

-continued

| Rank | Class | Type |
|------|-------|------|
| 3. | Recognizable | Poor |
| 4. | Unrecognizable | Landmarks |
| 5. | Unrecognizable | Geometric patterns |
| 6. | Unrecognizable | Mostly Solid |
| 7. | Unrecognizable | Solid |

For example, if the subsets of signatures includes a disparity map that is recognizable and good, and also includes a disparity map that is recognizable and fair, the method will select, as the selected IP vector, the IP vector associated with the disparity map that is recognizable and good, since that disparity map is ranked higher than the disparity map that is recognizable and fair.

When more than one IP vector is available within a family, some embodiments select, as the selected IP vector, the IP vector associated with the most recently added disparity map. For example, a most recently added disparity map will most likely have been assessed with the benefit of all prior disparity maps (and associated IP vectors), and its associated IP vector may therefore be considered to be the most accurate of the available IP vectors within a given classification and type. Other embodiments select, as the selected IP vector, that IP vector with the shortest runtime.

C. Selecting an IP Vector Using Signatures with Prior Knowledge of Environmental Conditions FIG. 10C is a flowchart that illustrates a method 1040 of operating a stereo matching system when the environmental conditions at the scene are known.

At step 1041, the known environmental conditions are provided to the stereo matching system. For example, the environmental conditions may be determined, and thus known, by observing and/or measuring the environmental conditions at the scene.

At step 1042, subsets of signatures are provided to the stereo matching system. The subsets of signatures may be as described above in connection with FIG. 7A, but in preferred embodiments are as described above in connection with FIG. 7B.

Step 1043 determines a selected IP vector based on the signatures and known environmental conditions. Specifically, step 1043 identifies a signature having environmental conditions that match the known environmental conditions, and elect as the selected IP vector an IP vector associated with that signature (see, e.g., FIG. 7A and/or FIG. 7B). The selected IP vector may be referred to as an environment-specific IP vector. When more than one IP vector is available within a family, some embodiments select, as the selected IP vector, the IP vector associated with the most recently added disparity map. For example, a most recently added disparity map will most likely have been assessed with the benefit of all prior disparity maps (and associated IP vectors), and its associated IP vector may therefore be considered to be the most accurate of the available IP vectors within a given classification and type. Other embodiments select, as the selected IP vector, that IP vector with the shortest runtime.

Then, at step 1044, the method receives one or more image pairs, and for each such received image pair, creates a disparity map using the selected IP vector.

The foregoing method allows a stereo matching system to create disparity maps in real time from a series of input image pairs. In preferred embodiments, such a stereo matching system is configured to create a disparity map for one input image pair prior to the arrival at the stereo matching system of a subsequent input image pair.

D. Selecting an IP Vector Using Signatures without Prior Knowledge of Environmental Conditions FIG. 10D is a flowchart that illustrates a method 1090 of operating a stereo matching system to process an initial pair of input images and subsequent pairs of input images. In preferred embodiments, each pair of input images is a cross-spectral pair of image of the same scene. The method 1090 begins at step 1091 by receiving the pair of input images. At step 1092, the method creates a disparity map from the initial pair of input images, and then at step 1093 the method computes a DM fingerprint histogram from the input disparity map.

The method also includes, at step 1094, providing a library of signatures for a corresponding plurality of previous disparity maps. Each such signature is associated with a set of environmental conditions. If the environmental conditions at the scene are known, the subsets of signatures provided at step 1094 may include signatures specifically correlated to those environmental conditions. If the environmental conditions at the scene are not known, the subsets of signatures provided at step 1094 may include signatures for a variety of environmental conditions, up to and including all available signatures.

At step 1095, the method identifies a preferred IP vector by matching the DM fingerprint to a one of the signatures, as described above, and identifying as a selected IP vector the input parameters associated with the matched disparity map.

Subsequently, at step 1096, the method uses the selected IP vector to produce future disparity maps from subsequent pairs of input images.

Some embodiments use the method of FIG. 10D to configure a stereo matching system when environmental conditions for at least one image of an input image pair are not known a priori. For example, a search and rescue aircraft 110 (FIG. 1A) may be dispatched before knowing exactly the terrain it will be searching, and/or what the weather (or other environmental conditions) will be when it performs its search using the stereo matching system. In such a situation, the search and rescue aircraft 110 may arrive on station and gather information about the terrain and other environmental conditions, including for example an IR image of the terrain. The stereo matching system may then, using the method of FIG. 10D, determine—automatically and without prior knowledge of the environmental condition of the search scene—an IP vector (and possible an optimal IP vector) that will produce the best available disparity maps. Because the terrain and/or other environmental conditions are not known a priori, the method may provide, at step 1094, subsets of signatures for a range of scenes, as described above in connection with FIG. 7A.

The following is a list of reference numbers uses herein.
100: Environment in which a stereo matching system may operate;
101: Terrain;
102: Stars;
110: Aircraft;
112: Aircraft camera system;
120: Spacecraft;
121: Celestial spacecraft camera;
122: Terrestrial spacecraft camera;
150: Stereo matching system;
151: Bus;
152: Communications interface module;
153: Image procurement module;

154: Memory;
155: Visual HOG generation module;
156: IR Hog generation module;
157: Input parameter (IP) vector selection module;
159: Disparity map generation module;
161: Environmental conditions module;
163: Fingerprint generation module;
164: Correlation module;
165: QME module;
166: DMC module;
170: Computer;
171: Display device;
172: Camera system;
174: Image storage;
200: Pixel matrix;
270: Pixel gradient;
271: X-axis gradient component;
272: Y-axis gradient component;
419: Fingerprint histogram;
420-426: Sub-ranges of histogram;
591: Pareto frontier;
592: Specified or selected disparity map from Pareto frontier;
600: 2D Pareto frontier;
710: Rule;
712: Signature;
715: Family of IP vectors;
720: Rule;
722: Signature;
725: Family of IP vectors.

Various embodiments of the present invention may be characterized by the potential claims listed in the paragraphs following this paragraph (and before the actual claims provided at the end of this application). These potential claims form a part of the written description of this application. Accordingly, subject matter of the following potential claims may be presented as actual claims in later proceedings involving this application or any application claiming priority based on this application. Inclusion of such potential claims should not be construed to mean that the actual claims do not cover the subject matter of the potential claims. Thus, a decision to not present these potential claims in later proceedings should not be construed as a donation of the subject matter to the public.

Without limitation, potential subject matter that may be claimed (prefaced with the letter "P" so as to avoid confusion with the actual claims presented below) includes:

Operating a Cross-Spectral Stereo Matching System

P1: A method of operating a cross-spectral stereo matching system for a scene, the method comprising: providing a plurality of rules, each rule corresponding to a respective set of environmental conditions; providing a set of environmental conditions corresponding to the scene; and determining, from the rules and based on the set of environmental conditions, an IP vector for the stereo matching system, the IP vector being an environment-specific IP vector correlated to the environmental conditions.

P2: The method of P1, further comprising: providing an input cross-spectral image pair in which each image of the input image pair is an image of the scene; and creating a disparity map corresponding to the input image pair, using the selected IP vector.

P3: The method of P1 further comprising: providing a plurality of input cross-spectral image pairs, in which each image of each of the plurality of input cross-spectral image pairs is an image of the scene; and creating a plurality of disparity maps using the selected IP vector, each disparity map of the plurality of disparity maps corresponding to a respective one of the plurality of input image pairs.

P4: The method of any of P1-P3, wherein the rules include a plurality of signatures, and determining an IP vector for the stereo matching system comprises: selecting the IP vector correlated to the highest ranking signature from the plurality of signatures.

P5: The method of any of P1-P3, wherein determining an IP vector for the stereo matching system comprises: selecting the IP vector having the shortest runtime.

IP Vector Classification

P101: A computer-implemented method of automatically classifying an IP vector, the method comprising: receiving an input cross-spectral image pair; generating, from the input cross-spectral image pair and the IP vector, a disparity map; generating, from the disparity map, a fingerprint; providing a set of signatures from previously-assessed disparity maps, each signature from the set of signatures having a corresponding class; matching the fingerprint to a signature from the set of signatures; and assigning, to the IP vector, the class corresponding to the signature.

P102: The method of P101, wherein each signature from the set of signatures also has a type, the type being a subset of the class corresponding to the signature, and the method further includes assigning, to the IP vector, the type corresponding to the signature.

P103: The method of P101 further comprising adding, to the set of signatures, the IP vector according to the class assigned to the corresponding IP vector.

P104: The method of P102 further comprising adding, to the set of signatures, the IP vector according to the class and type assigned to the corresponding IP vector.

P105: The method of P101, wherein each signature from the set of signatures also has an associated set of environmental conditions, and the method further includes assigning, to the IP vector, the associated set of environmental conditions.

P106: The method of P101 wherein the fingerprint comprises a fingerprint histogram and each signature from the set of signatures comprises a corresponding signature histogram, and matching the fingerprint to a signature from the set of signatures comprises matching the fingerprint histogram to a one of the signature histograms.

P107: The method of P101 wherein the fingerprint comprises a fingerprint histogram and each signature from the set of signatures comprises a corresponding signature histogram, and matching the fingerprint to a signature from the set of signatures comprises determining that a majority of disparities in the fingerprint histogram falls within the three lowest partitions of the fingerprint histogram.

P108: The method of P101 wherein the fingerprint comprises a fingerprint histogram and each signature from the set of signatures comprises a corresponding signature histogram, and matching the fingerprint to a signature from the set of signatures comprises determining a fingerprint entropy for the fingerprint histogram, and determining a signature entropy for the signature histogram, and matching the fingerprint entropy to the signature entropy.

Automatically Selecting an IP Vector for a Cross-Spectral Stereo Matching System P200: A computer-implemented method of automatically selecting an IP vector for a cross-spectral stereo matching system, the method comprising: receiving an input cross-spectral image pair of a scene; generating, from the input cross-spectral image pair, a plurality of disparity maps, each disparity map of the plurality of disparity maps produced by a unique corresponding IP vector; generating, from the plurality of disparity maps, a corresponding plurality of fingerprints, each fingerprint of the plurality of fingerprints associated with a corresponding IP vector; providing a set of signatures, each signature of the set of signatures associated with a corresponding environmental condition and classification; matching each fingerprint of the plurality of fingerprints to a corresponding one of the signatures; associating each IP vector with the class associated with the signature to which its fingerprint matches to produce, for each classification, a set of IP vectors; and selecting, as the selected IP vector, an IP vector from a set of IP vectors associated with the highest classification.

P201: The method of P200 further comprising ranking each IP vector by its associated classification.

Automatically Classifying Disparity Maps and IP Vectors

P300: A computer-implemented method of automatically classifying a plurality of disparity maps (and their respective associated IP vectors) for a cross-spectral image pair, the method comprising:

receiving the cross-spectral pair of images, the cross-spectral pair of images comprising a visual image of a scene and an infrared image of the scene;

generating, from the cross-spectral pair of images, a plurality of disparity maps, each disparity map generated using a unique corresponding IP vector;

recording, for each disparity map of the plurality of disparity maps, the runtime required to produce said disparity map; and ranking the plurality of disparity maps in order of runtime.

P301: The method of P300, further comprising:

determining, for each disparity map, a validity metric, the validity metric being a quantitative indicator of how recognizable structures are in a scene in the cross-spectral image pair.

P302: The method of P301, wherein determining, for each disparity map, a validity metric comprises:

determining, for each disparity map, a number of disparities in said disparity map;

identifying, by magnitude, a median disparity, the median disparity having a median magnitude;

determining, as the validity metric, a quantity, wherein the quantity is the number of disparities having a magnitude that is less than the magnitude of the median disparity.

P303: The method of P300, further comprising:

determining, for each disparity map, an accuracy metric, the accuracy metric being a quantitative indicator of how closely the disparity map resembles the images of the cross-spectral image pair.

P304: The method of P303 wherein determining, for each disparity map, an accuracy metric comprises:

summing the disparities of the disparity map to produce a sum of disparities; and establishing, as the accuracy metric for said disparity map, the sum of disparities.

P305: The method of P300, further comprising:

determining, for each disparity map, a validity metric;

identifying a first set of disparity maps, the first set comprising validity maps having a validity metric above a first threshold;

determining, for each disparity map, an accuracy metric;

identifying a second set of disparity maps, the second set comprising disparity maps having an accuracy metric above a second threshold;

identifying a third set of disparity maps (which may be referred to as a "Pareto set"), the third set comprising disparity maps being common to the first set and the second set;

producing a 3D Pareto frontier having three axes, wherein the 3D Pareto frontier comprises the disparity maps from the third set, wherein the three axes are runtime, validity metric, and accuracy metric.

Some embodiment determine an IP vector for creating a disparity map, based on a pre-existing disparity map.

P400: A computer-implemented method of determining an IP vector for use in a stereo matching algorithm to produce a new disparity map, the method comprising:

providing a pre-existing disparity map;

producing, from the pre-existing disparity map and using the computer, a signature;

procuring an input image pair of a scene (which may, in some embodiments, be a cross-spectral image pair);

providing a plurality of candidate IP vectors;

producing, from the input image pair and each of the plurality of candidate IP vectors; a plurality of disparity maps, each disparity map produced by a unique corresponding IP vector;

producing, from each of the plurality of disparity maps, a corresponding fingerprint, to produce a plurality of fingerprints, each fingerprint of the plurality of fingerprints being associated with a one of the unique corresponding IP vectors;

ranking the plurality of fingerprints by similarity to the signature, to produce a set of ranked fingerprints;

selecting, as the selected IP vector, an IP vector associated with a one of the ranked fingerprints (e.g., by highest rank; runtime; etc.)

Various embodiments of the invention may be implemented at least in part in any conventional computer programming language. For example, some embodiments may be implemented in a procedural programming language (e.g., "C"), or in an object oriented programming language (e.g., "C++"). Other embodiments of the invention may be implemented as preprogrammed hardware elements (e.g., application specific integrated circuits, FPGAs, and digital signal processors), or other related components. Illustrative embodiments are implemented in MATLAB.

In an alternative embodiment, the disclosed apparatus and methods may be implemented as a computer program product for use with a computer system. Such implementation may include a series of computer instructions fixed on a tangible medium, such as a non-transient computer readable medium (e.g., a diskette, CD-ROM, ROM, FLASH memory, or fixed disk). The series of computer instructions can embody all or part of the functionality described herein with respect to the system.

Those skilled in the art should appreciate that such computer instructions can be written in a number of programming languages for use with many computer architectures or operating systems. Furthermore, such instructions may be stored in any suitable memory device, such as semiconductor, magnetic, optical or other memory devices, and may be transmitted using any suitable communications technology, such as optical, infrared, microwave, or other transmission technologies.

Among other ways, such a computer program product may be distributed as a removable medium with accompanying printed or electronic documentation (e.g., shrink wrapped software), preloaded with a computer system (e.g., on system ROM or fixed disk), or distributed from a server or electronic bulletin board over the network (e.g., the Internet or World Wide Web). Of course, some embodiments of the invention may be implemented as a combination of both software (e.g., a computer program product) and hardware. Still other embodiments of the invention are implemented as entirely hardware, or entirely software.

The embodiments of the invention described above are intended to be merely exemplary; numerous variations and modifications will be apparent to those skilled in the art. All such variations and modifications are intended to be within the scope of the present invention as defined in any appended claims.

What is claimed is:

1. A computer-implemented method of automatically classifying a disparity map for a cross-spectral image pair, the method comprising:
   generating, from a cross-spectral pair of images comprising a visual image of a scene and an infrared image of the scene, a disparity map using a corresponding input parameter (IP) vector;
   generating, from the disparity map, a fingerprint;
   providing a set of signatures, each signature of the set of signatures being associated with a corresponding class;
   matching the fingerprint to one fingerprint of the set of signatures, the one fingerprint of the set of signatures being a matched signature; and
   classifying the disparity map into the class associated with the matched signature, wherein classifying the disparity map includes assigning, to the corresponding IP vector, the class associated with the matched signature.

2. The method of claim 1, further comprising, prior to generating the disparity map, procuring the cross-spectral pair of images.

3. The method of claim 2, wherein procuring the cross-spectral pair of images comprises obtaining the visual image from a database of visual images, and capturing the infrared image with an infrared camera.

4. The method of claim 2, wherein procuring the cross-spectral pair of images comprises obtaining the infrared image from a database of infrared images, and capturing the visual image with a visual camera.

5. The method of claim 1, wherein each signature of the set of signatures is associated with a type, the type being a subcategory of the corresponding class, the method further comprising classifying the disparity map into the class and type associated with the matched signature.

6. The method of claim 1, wherein each signature of the set of signatures is associated with a set of environmental conditions describing the scene, the method further comprising associating the disparity map with the environmental conditions.

7. The method of claim 1, further comprising updating the matched signature to include the fingerprint.

8. The method of claim 7, wherein the signature is a histogram having a plurality of signature partitions, and the fingerprint is a histogram having a corresponding set of fingerprint partitions, and updating the matched signature to include the fingerprint comprises creating an updated signature by averaging each signature partition with its counterpart fingerprint partition.

9. The method of claim 1, wherein:
   classifying the disparity map into the class associated with the matched signature comprises assigning, to the corresponding IP vector, the class associated with the matched signature to produce a classified IP vector; the method further comprising:
   adding the classified IP vector to a family of previously-classified IP vectors, each of the previously-classified IP vectors being classified into the class associated with the matched signature.

10. A system for automatically classifying a disparity map for a cross-spectral image pair, the system comprising:
    an image procurement module configured to procure the cross-spectral image pair, the cross-spectral image pair comprising a visual image of a scene and an infrared image of the scene;
    a disparity map generation module configured to generate, from the cross-spectral image pair, a disparity map using a corresponding IP vector;
    a fingerprint generation module configured to generate, from the disparity map, a fingerprint;
    a memory having a set of signatures, each signature of the set of signatures associated with a corresponding class;
    a matching module configured to match the fingerprint to a one of the signatures in the set of signatures, the one of the signatures being a matched signature; and
    a classification module configured to classify the disparity map into the class associated with the matched signature and assign, to the corresponding IP vector, the class associated with the matched signature.

11. The system of claim 10 further comprising:
    a database of visual images in data communication with the image procurement module and configured to provide the visual image of the scene; and
    an infrared camera disposed to capture the infrared image of the scene.

12. The system of claim 10, wherein each signature of the set of signatures is associated with a set of environmental conditions describing the scene, and wherein the classification module is further configured to associate the disparity map with the set of environmental conditions.

13. A computer-implemented method of automatically classifying a plurality of disparity maps for a cross-spectral image pair, the method comprising:
    receiving the cross-spectral pair of images, the cross-spectral pair of images comprising a visual image of a scene and an infrared image of the scene;
    generating, from the cross-spectral pair of images, a plurality of disparity maps, each disparity map being generated using a unique corresponding IP vector;
    recording, for each disparity map of the plurality of disparity maps, a runtime required to produce said disparity map; and
    ranking the plurality of disparity maps in order of runtime.

14. The method of claim 13, further comprising:
    determining, for each disparity map, a validity metric, the validity metric being a quantitative indicator of how recognizable structures are in a scene in the cross-spectral image pair.

15. The method of claim 14, wherein determining the validity metric comprises:
    determining, for each disparity map, a number of disparities in said disparity map;
    identifying, by magnitude, a median disparity, the median disparity having a median magnitude; and
    determining, as the validity metric, a quantity, wherein the quantity is a number of disparities having a magnitude that is less than the magnitude of the median disparity.

16. The method of claim 13, further comprising:
    determining, for each disparity map, an accuracy metric, the accuracy metric being a quantitative indicator of how closely the disparity map resembles the images of the cross-spectral image pair.

17. The method of claim 16, wherein determining, for each disparity map, the accuracy metric comprises:
    summing the disparities of the disparity map to produce a sum of disparities; and establishing, as the accuracy metric for said disparity map, the sum of disparities.

18. The method of claim 13, further comprising:

determining, for each disparity map, a validity metric;

identifying a first set of disparity maps, the first set of disparity maps comprising validity maps having a validity metric above a first threshold;

determining, for each disparity map, an accuracy metric;

identifying a second set of disparity maps, the second set of disparity maps comprising disparity maps having an accuracy metric above a second threshold;

identifying a third set of disparity maps (the "Pareto set"), the third set of disparity maps comprising disparity maps common to the first set of disparity maps and the second set of disparity maps; and producing a 3D Pareto frontier having three axes, wherein the 3D Pareto frontier comprises the disparity maps from the third set of disparity maps, wherein the three axes are runtime, validity metric, and accuracy metric.

* * * * *